United States Patent [19]
Eto

[11] Patent Number: 5,652,823
[45] Date of Patent: Jul. 29, 1997

[54] VIDEO DATA ENCODER AND DECODER

[75] Inventor: Toru Eto, Kanagawa, Japan

[73] Assignee: Sony Corporation, Tokyo, Japan

[21] Appl. No.: 627,501

[22] Filed: Apr. 4, 1996

[30] Foreign Application Priority Data

Apr. 8, 1995 [JP] Japan ................................ 7-108185

[51] Int. Cl.$^6$ ............................... H04N 5/783; H04N 5/92
[52] U.S. Cl. ..................... 386/68; 386/109; 386/111
[58] Field of Search .................................. 386/6–8, 33, 68,
386/109, 111, 112; 360/69, 74.1; H04N 5/92,
9/79, 5/76, 5/783

[56] References Cited

U.S. PATENT DOCUMENTS

| | | | |
|---|---|---|---|
| 4,897,720 | 1/1990 | Wu et al. | 348/412 |
| 5,537,215 | 7/1996 | Nimura et al. | 386/68 |
| 5,576,902 | 11/1996 | Lane et al. | 386/68 |

*Primary Examiner*—Thai Tran
*Attorney, Agent, or Firm*—William S. Frommer; Alvin Sinderbrand

[57] ABSTRACT

In a video data decoding apparatus, only video information of decoding unit containing video data decoded by use of video data different from video data used to decode video data upon encoding is eliminated, and only correct video data can be outputted. Thus, when a picture is displayed in the reverse direction, the change of such picture in the reverse direction can be made smooth considerably. A motion decoder comprises decoding means (102), (103) for decoding video data of GOP, a rearrangement means (101) for rearranging GOP data, a selecting means (104) for selecting outputs from the decoding means (102), (103), a memory means (105) for storing an output from the selecting means (104), and a selecting means (107) for inhibiting the selecting means (104) from selecting GOP containing video data decoded by use of video data different from video data used upon encoding when the order in which video data of GOP are inputted is opposite to the order in which the video data of GOP are encoded upon encoding.

24 Claims, 16 Drawing Sheets

FIG. 9

| Mode | Positive Direction | | | | Reverse Direction | | | |
|---|---|---|---|---|---|---|---|---|
| Switch 67 | a | b | a | b | a | b | a | b |
| Switch 68 | a | b | a | b | a | b | a | b |
| Switching Control Signal | 1 | 0 | 1 | 0 | 1 | 0 | 1 | 0 |
| Switch 70 | a | | b | | a | | b | |
| Switch 71 | b | | a | | b | | a | |
| Switching Control Signal | 1 | | 1 | | 1 | | 0 | |
| | T | T | T | T | T | T | T | T |

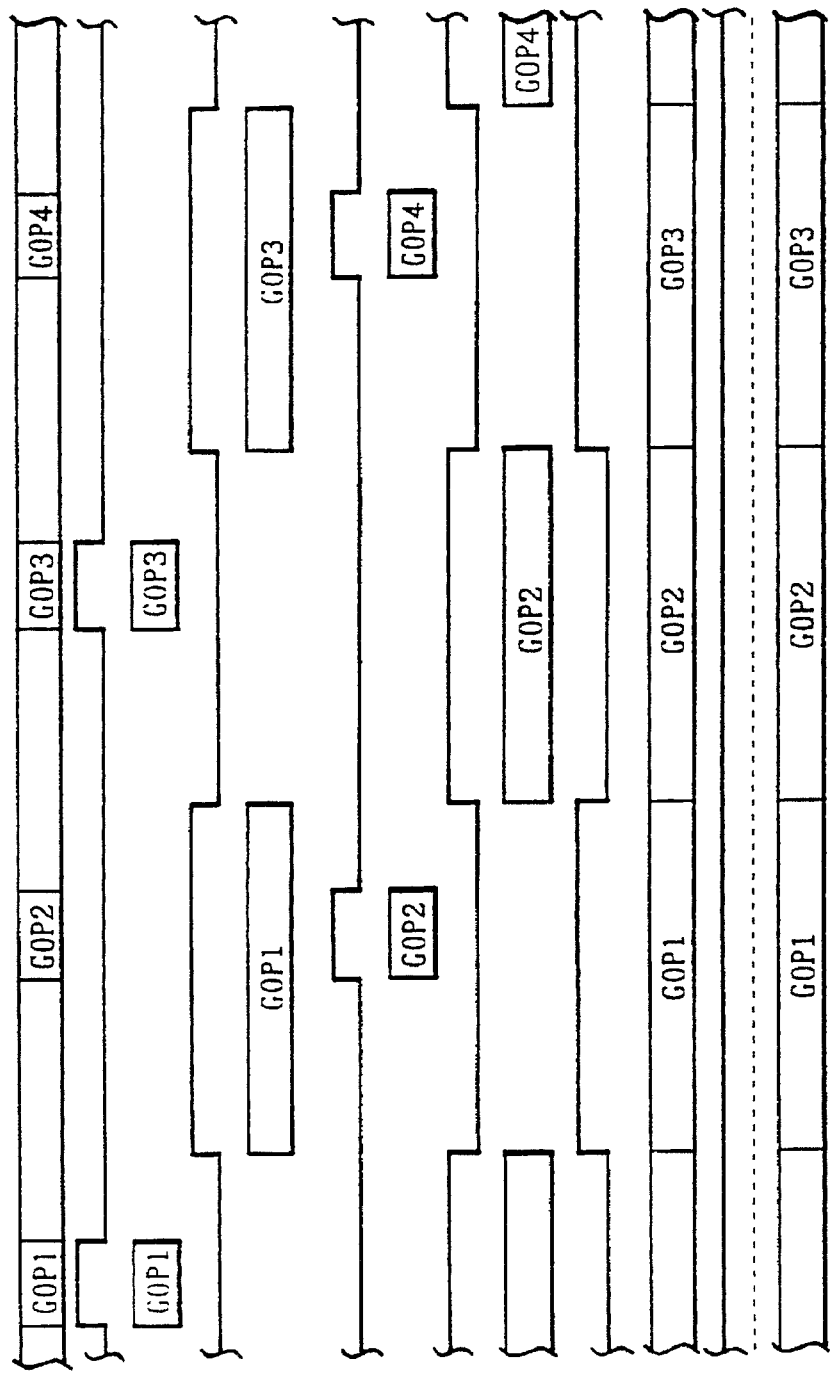

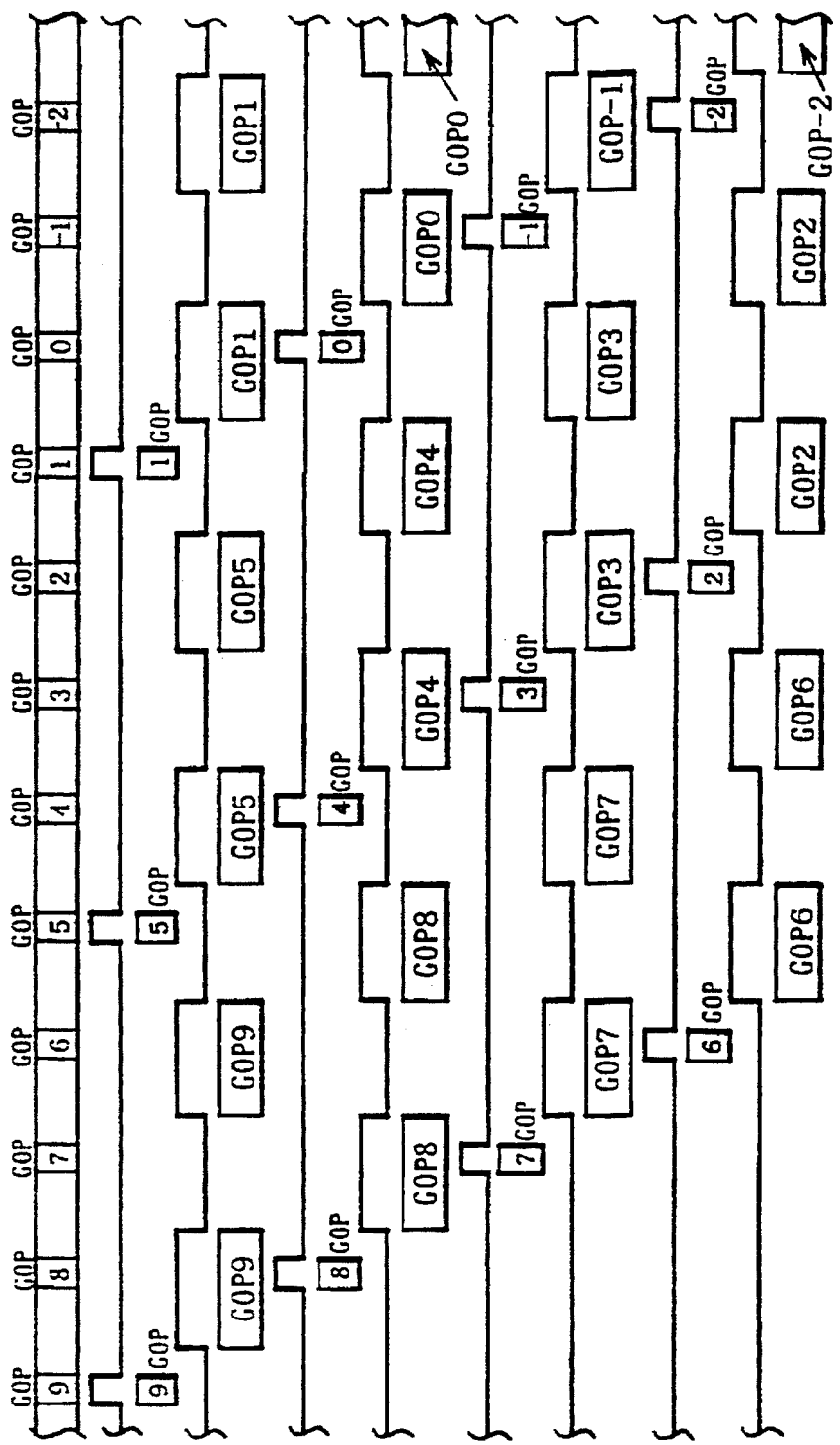

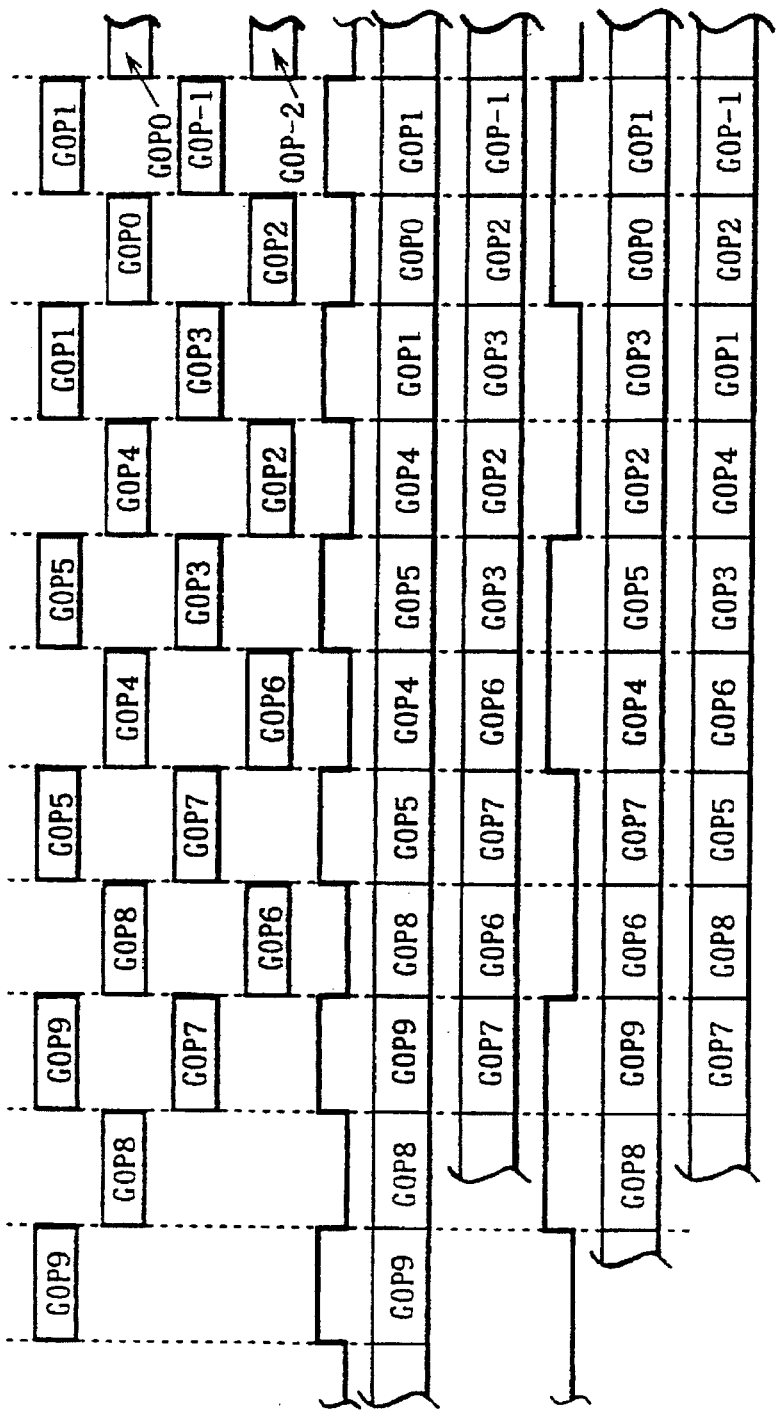

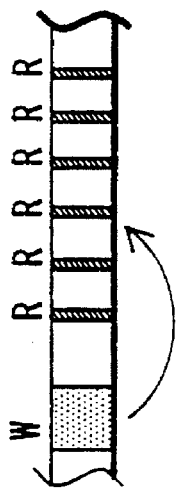
FIG. 13A
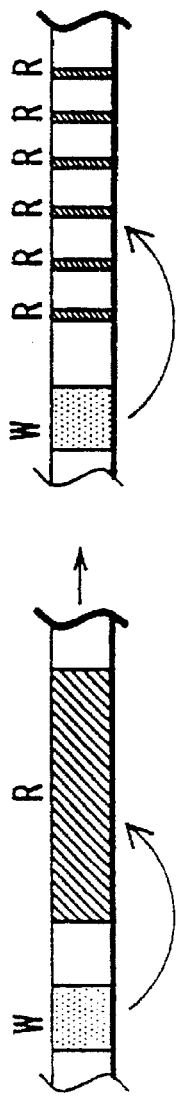
FIG. 13B
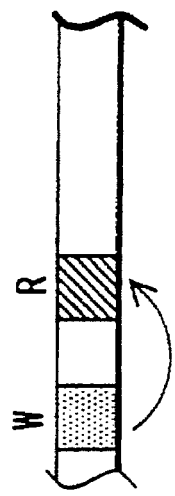
FIG. 13C
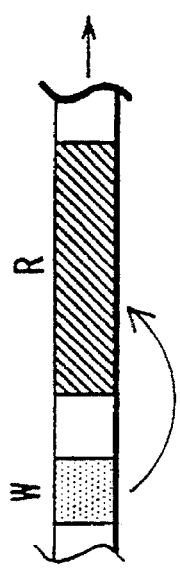
FIG. 13D
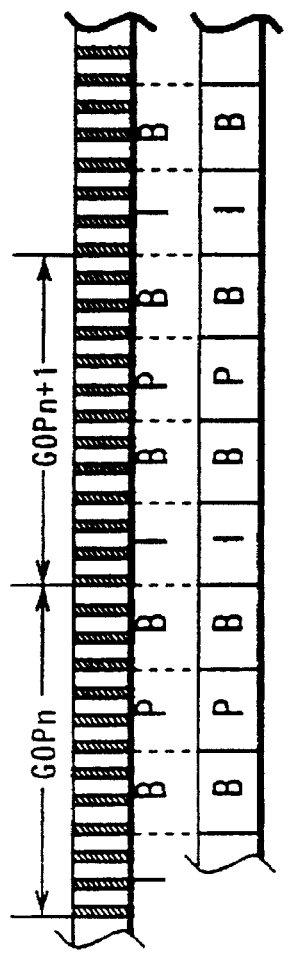
FIG. 13E
FIG. 13F

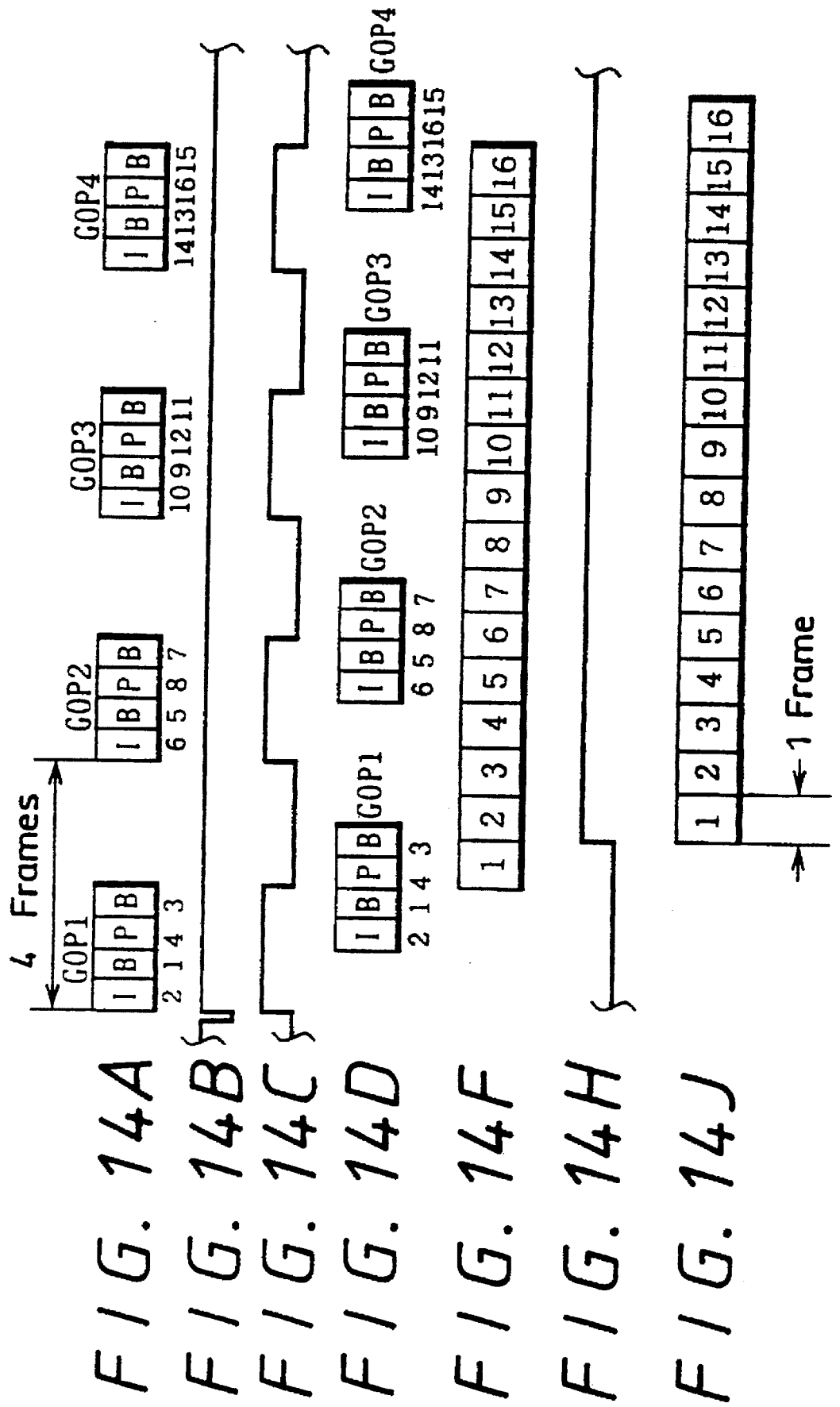

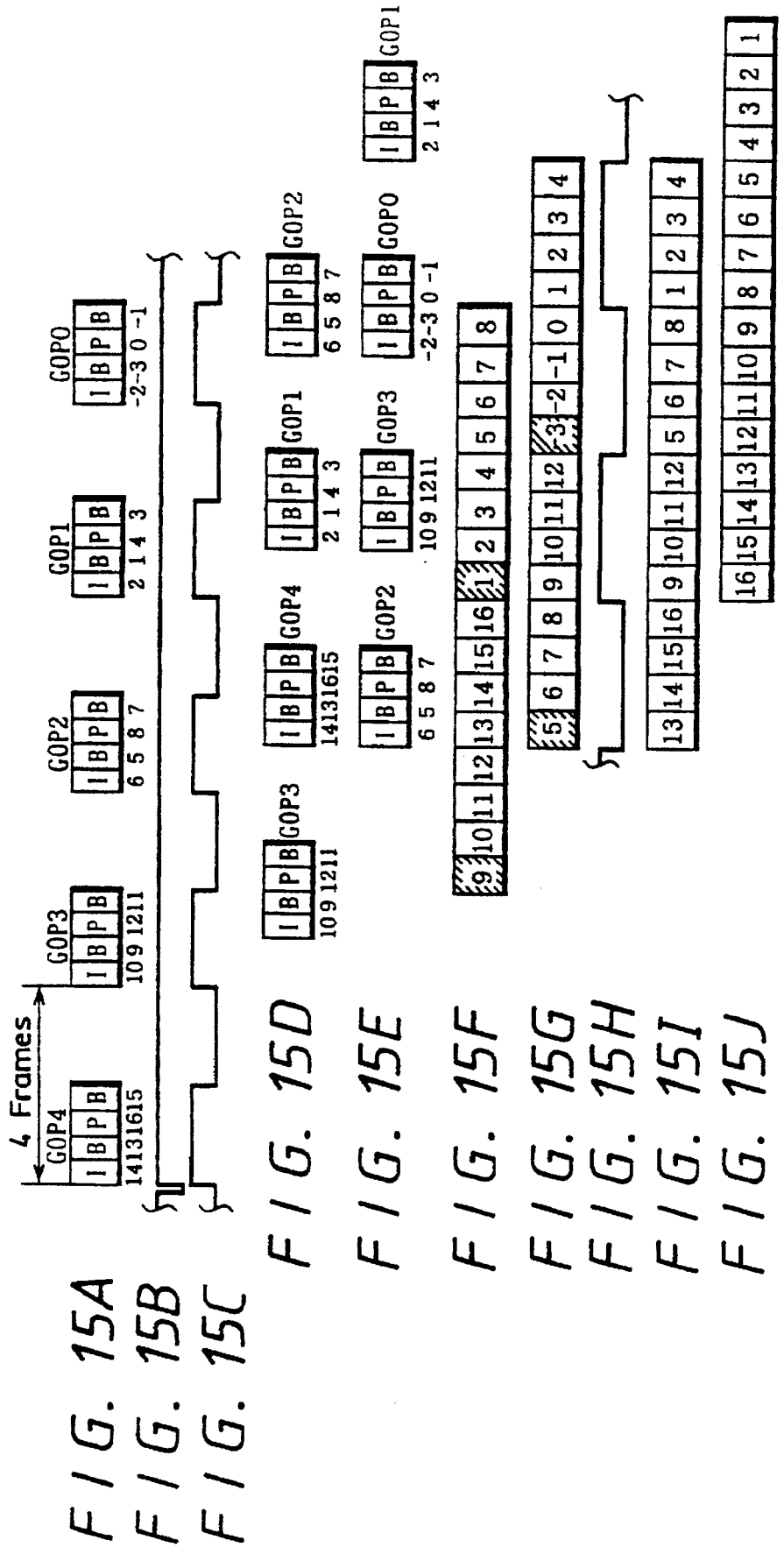

VIDEO DATA ENCODER AND DECODER

BACKGROUND OF THE INVENTION

The present invention relates to a recording and reproducing apparatus for reproducing video data recorded on a recording medium such as a disk or a magnetic tape, a video data decoding apparatus and a video data reproducing apparatus for use with an information transmission system.

A transmission side of an information transmission apparatus or a recording side of a recording and reproducing apparatus using a disk or a magnetic tape as a recording medium has hitherto used a motion encoder shown in FIG. 1, and a reproducing side thereof has hitherto used a motion decoder shown in FIG. 2. The motion encoder shown in FIG. 1 and the motion decoder shown in FIG. 2 shall be in accordance with a storage moving image coding standard standardized based on a standardization work promoted by an MPEG (moving picture image coding experts group) system.

The motion encoder shown in FIG. 1 comprises frame memories (FMs) 201, 202, 203 for sequentially storing therein video data supplied thereto from an input terminal 200, a selector 204 for selectively outputting outputs from these frame memories 201, 202, 203 in response to a control signal supplied thereto from a system controller 226, a motion detection block for obtaining motion vector data by executing a motion detection, a motion-compensation block for executing a motion-compensation based on the motion vector data calculated by the above motion detection block, an adding circuit 207 for calculating a difference between macroblock data of 16 lines×16 pixels supplied thereto from the selector 204 and motion-compensated macroblock data of 16 lines×16 pixels supplied thereto from the motion-compensation block, an inter/intra judgement circuit 208 for selecting either the macroblock data supplied thereto from the selector 204 or difference data supplied thereto from the adding circuit 207, a switch 209 for selecting either the macroblock data supplied thereto from the selector 204 or the difference data supplied thereto from the adding circuit 207 under control of the inter/intra judgement circuit 208, a compressing and encoding block for compressing and encoding an output from the switch 209, and the system controller 226 for controlling the above-mentioned circuit elements.

When video data are sequentially inputted to the input terminal 200, the inputted video data are sequentially stored in the frame memory 201, video data that has been read out from the frame memory 201 during the next one frame period are sequentially stored in the frame memory 202 and video data that has been read out from the frame memory 202 during the next one frame period are sequentially stored in the frame memory 203, after a time period of 3 frames is elapsed, video data of a first frame is stored in the frame memory 203, and video data of a third frame is stored in the frame memory 201, respectively. Accordingly, if the output of the frame memory 202 is set to video data of present frame, then the output of the frame memory 201 becomes video data of a future frame, and the output of the frame memory 203 becomes video data of a past frame. The output of the macroblock unit from the frame memory 201 will hereinafter be referred to as "macroblock data of future frame", the output of the macroblock unit from the frame memory 202 will hereinafter be referred to as "macroblock data of present frame, and the output of the macroblock unit from the frame memory 203 will hereinafter be referred to as "macroblock data of preceding frame", respectively.

The compressing and encoding block comprises a DCT (discrete cosine transform) circuit 210 for transforming the macroblock data or difference data from the switch 209 at the block unit of 8 lines×8 pixels from a DC component to a high-order AC component, a quantizing circuit 211 for quantizing coefficient data supplied thereto from the DCT circuit 210 at a predetermined quantization step size, a VLC (variable length code) encoder 212 for variable-length-coding the coefficient data supplied thereto from the quantizing circuit 211 by a suitable method such as run-length-coding method or Huffman-coding method, and an encoding circuit 213 for encoding the variable-length-coded data supplied thereto from the VLC encoder 212 by adding an inner parity and an outer parity for recording or transmission to provide data in the form of a product code.

The motion detection block comprises a motion detecting circuit 205 for obtaining motion vector data by effecting a motion detection on the macroblock data of the preceding frame supplied thereto from the frame memory 201 and the macroblock data of the present frame supplied thereto from the frame memory 202, and a motion detecting circuit 206 for obtaining motion vector data by effecting the macroblock data of the future frame supplied thereto from the frame memory 203 and the macroblock data of the present frame supplied thereto from the frame memory 202.

The motion-compensating block comprises an inverse-quantizing circuit 215 for obtaining the coefficient data of the DCT circuit 210 by inverse-quantizing the coefficient data supplied thereto from the quantizing circuit 211, an IDCT (inverse discrete cosine transform) circuit 216 for inverse-discrete-cosine-transforming coefficient data supplied thereto from the inverse-quantizing circuit 215 into the original macroblock data or difference data, an adding circuit 217 for adding the output from the IDCT circuit 216 and the motion-compensated macroblock data, a switch 218 for supplying the output of the adding circuit 217 and the output of the IDCT circuit 216 on the basis of a switching control signal supplied thereto from the inter/intra judgement circuit 208, a frame memory 219 for storing the output from the switch 218 in its storage area, a frame memory 221 for sequentially storing the macroblock data read out from the frame memory 219, a motion-compensating circuit 220 for selecting proper macroblock data from frame data stored in the frame memory 219 on the basis of the motion vector data supplied thereto from the motion detecting circuit 205 and outputting macroblock data thus selected as motion-compensated macroblock data, a motion-compensating circuit 222 for selecting proper macroblock data from frame data stored in the frame memory 221 on the basis of the motion vector data supplied thereto from the motion detecting circuit 206 and outputting macroblock data thus selected as motion-compensated macroblock data, a weighting circuit 223 for weighting the motion-compensated macroblock data supplied thereto from the motion-compensating circuits 220, 222 by weighting coefficient data corresponding to a time distance of present frame, a synthesizing circuit 224 for synthesizing two macroblock data weighted by the weighting circuit 223, and a switch 225 for selectively outputting the motion-compensated macroblock data from the motion-compensating circuit 220, the motion-compensated macroblock from the motion-compensating circuit 222 and the synthesized macroblock data supplied thereto from the synthesizing circuit 224 on the basis of a switching control signal supplied thereto from the system controller 226.

The inter/intra judgement circuit 208 compares dispersed values such as the macroblock data from the selector 204 and the difference data from the adding circuit 207, and selects a smaller dispersed value.

The motion-compensating circuit 220 motion-compensates macroblock data of future frame which precedes the macroblock data of frame outputted from the selector 204 from a time standpoint. The motion-compensating circuit 222 motion-compensates the macroblock data of the past frame which follows the macroblock data of frame outputted from the selector 204 from a time standpoint. The weighting circuit 223 and the synthesizing circuit 224 motion-compensate the future and preceding macroblock data, which are behind or ahead of the macroblock data of the frame outputted from the selector 204 by weighting and synthesizing the two motion-compensated macroblock data supplied thereto from the motion-compensating circuits 220, 222, and obtain synthesized macroblock data of the two motion-compensated macroblock data.

The adding circuit 207 encodes the macroblock data of the frame sequentially outputted from the selector 204 by calculating a difference among the above macroblock data and any one of the outputs from the above three systems, i.e., motion-compensated macroblock data. The difference data from the adding circuit 207 is interframe difference data, and the interframe difference data is encoded. Therefore, this processing is referred to as an "interframe-coding (intercoding). Also, the output from the selector 204 is encoded as it is, and hence this processing is referred to as an "intraframe-coding (intra-coding)".

Video data of respective frames outputted from the selector 204 and encoded are generally referred to as "I picture", "B picture", "P picture", in accordance with their encoded forms.

The I picture is encoded video data of one frame composed of intraframe-coded macroblock data of present frame outputted from the selector 204. The encoding in this case is carried out by the DCT circuit 210, the quantizing circuit 211 and the VLC encoder 212. Accordingly, in the case of the I picture, the switches 209, 218 constantly connect movable contacts c to fixed contacts a under control of the inter/intra judgement circuit 208, respectively. In this case, "present frame" represents macroblock data of frame which is outputted from the selector 204 and encoded (intraframe-coded) as it is or which is outputted from the selector 204 and calculated in difference and then encoded (interframe-coded).

The P picture is data which results from encoding (interframe-coding) difference data between motion-compensated macroblock data of I picture or P picture which becomes a preceding frame from a time standpoint relative to the macroblock data of present frame outputted from the selector 204 and the macroblock data of the present frame or intraframe-coded data of the macrobloock data of the present frame. However, when the P picture is generated, motion vector data for motion-compensating video data provided as I picture is determined on the basis of encoded video data serving as P picture and video data preceding this video data as seen from the sequential order in which they are inputted to the motion encoder.

The B picture is data which results from encoding (interframe-coding) difference data among the macroblock data of present frame outputted from the selector 204 and the following macroblock data of six kinds.

The macroblock data of six kinds are macroblock data of present frame outputted from the selector 204, motion-compensated macroblock data of I picture or P picture which becomes a preceding frame relative to the macroblock data of present frame from a time standpoint, motion-compensated macroblock data of I picture or P picture which becomes a preceding frame relative to the macroblock data of present frame from a time standpoint, interpolation macroblock data generated from the I picture which becomes a preceding frame relative to the macroblock data of present frame outputted from the selector 204 and the P picture which becomes a preceding frame relative to the macroblock data of present frame outputted from the selector 204 from a time standpoint, and interpolation macroblock data generated from the P picture which becomes a preceding frame and the P picture which becomes a preceding frame relative to the macroblock data of present frame outputted from the selector 204 from a time standpoint.

As is clear from the above explanation, the P picture includes data encoded by use of video data of frames except the present frame, i.e., interframe-coded data, and the B picture is composed of only interframe-coded data so that the P picture and the B picture cannot be decoded alone. Therefore, as is well known, a plurality of relating pictures are set to one GOP (Group Of Picture), and the P picture and the B picture are processed at the unit of GOP.

In general, the GOP comprises one or a plurality of pictures, and zero or a plurality of non-I pictures. In the following description, one GOP comprises I picture, P picture and two B pictures for the sake of simplicity.

In the following description, let it be assumed that the B picture results from calculating a difference between video data of preceding and succeeding video data of the B picture and that the P picture is obtained from the I picture. In actual practice, upon encoding, of interpolated macroblock data interpolated in the forward direction motion compensation, interpolation motion compensation, and backward direction motion compensation, macroblock data with a highest coding efficiency is selected. Upon decoding, data is compensated at the macroblock unit similarly to the encoding process. Specifically, in difference data provided within one B picture, motion-compensated data motion-compensated by any one of the forward direction motion-compensation, the interpolation motion-compensation and the backward direction motion-compensation becomes data subtracted from the macroblock data to be encoded. In difference data provided within one P picture, motion-compensated macroblock data motion-compensated by any one of the forward direction motion-compensation or the backward direction motion-compensation becomes data subtracted from the macroblock data to be encoded. Accordingly, in the following description, except when video data of every original frame is referred to as "video data", this "video data" shall be understood as "video data of every macroblock".

An operation of the encoder shown in FIG. 1 will be described below.

The video data supplied to the input terminal 200 is sequentially stored in the frame memories 201, 202, 203. The motion detecting circuit 205 carries out a motion detection based on the preceding frame macroblock data supplied thereto from the frame memory 201 and the present frame macroblock data supplied thereto from the frame memory 202, and supplies resultant motion vector data to the motion compensating circuit 220. On the other hand, the motion detecting circuit 206 carries out a motion detection based on the preceding frame macroblock data supplied thereto from the frame memory 203 and the present frame macroblock data supplied thereto from the frame memory 202, and supplies resultant motion vector data to the motion compensating circuit 222. As described above, the motion detecting circuits 205, 206 obtain motion vector data at every macroblock data.

When the encoder shown in FIG. 1 is supplied with motion vector data indicative of motion vectors between all macroblock data of present frame and all macroblock data of future frame and motion vector data indicative of motion vectors between all macroblock data of present frame and all macroblock data of preceding frame, the above encoder starts the encoding processing.

A manner in which macroblock data outputted from the selector 204 are encoded will be described with reference to also FIGS. 3A and 3B.

FIG. 3A shows vide data of every frame supplied to the input terminal 200, and FIG. 3B shows video data of every frame outputted from the selector 204. Of reference numerals shown in blocks serving as frames, reference numerals indicate the orders of inputted frames. Of reference letters, "B" represents data which is encoded as B picture, "I" represents data which is encoded as I picture, and "P" represents data which is encoded as P pictures, respectively.

Video data shown by arrows depict video data to be encoded, and video data from which arrows are started being drawn depict video data used when the video data to be encoded are encoded. Specifically, arrows in FIG. 3A show frames of video data used as predictive video data when video data of respective frames shown by arrows are encoded. Video data of third frame which becomes B picture by encoding is encoded by calculating a difference between one of video data of second frame which becomes I picture by encoding and video data of fourth frame which becomes P picture by encoding or synthesized video data of these two video data. With respect to P pictures, arrows for indicating the frames used as predictive video data are not shown.

Frames within GOP2 of FIGS. 3A, 3B will be described by way of example. In this case, let it be assumed that video data P4 used as predictive video data of video data B5 shown in FIG. 3A is stored in the frame memory 221 shown in FIG. 1. Further, for the sake of simplicity, it is further assumed that predictive video data from the synthesizing circuit 224 is constantly used to obtain B picture by encoding.

As shown in FIG. 3B, video data I6 is sequentially outputted from the selector 204 at every macroblock data. At that time, the movable contacts c of the switches 209, 218 are connected to intra-side fixed contacts b. Accordingly, after the macroblock data of the video data I6 has been passed through the switch 209, such macroblock data of the video data I6 is sequentially processed by the DCT circuit 210, the quantizing circuit 211, the VLC encoder 212 and the encoding circuit 213, and then outputted through an output terminal 214.

On the other hand, coefficient data of the video data I6 quantized by the quantizing circuit 211 is reconverted by the inverse-quantizing circuit 215 and the IDCT circuit 216 to the original macroblock data of 8 lines×8 pixels, and supplied through the switch 218 to the frame memory 219, and thereby sequentially stored in the frame memory 219.

After video data P4 has been stored in the frame memory 221 and the video data I6 has been stored in the frame memory 219, predictive video data from the synthesizing circuit 224 is subtracted from video data B5 outputted from the selector 204 by the adding circuit 207, and thereby resultant difference data is encoded. Accordingly, before the video data B5 is outputted from the selector 204, the video data I6 is stored in the frame memory 201, the video data B5 is stored in the frame memory 202, and video data P4 is stored in the frame memory 203.

In this case, the motion detecting circuit 205 generates motion vector data indicative of macroblocks of the video data B5 coincident with somewhere (macroblock data) of the video data I6 by detecting a motion of the macroblocks of the video data B5 stored in the frame memory 202 and the macroblocks of the video data I6. The motion vector data of every macroblock are used by the motion compensating circuit 220 when corresponding macroblock data within the video data I6 stored in the frame memory 219 are sequentially read out, i.e., motion-compensated.

On the other hand, the motion detecting circuit 206 generates macroblocks of the video data B5 coincident with somewhere (macroblock data) of the video data P4 by detecting a motion of the macroblocks of the video data B5 stored in the frame memory 202 and the macroblocks of the video data P4 stored in the frame memory 203. The motion vector data of every macroblock data are used by the motion compensating circuit 222 when corresponding macroblock data provided within the video data P4 stored in the frame memory 221 are sequentially read out, i.e., motion-compensated.

As the macroblock data of the video data B5 are outputted from the selector 204, the synthesizing circuit 224 outputs synthesized macroblock data of the macroblock data of the motion-compensated video data I6 supplied thereto from the motion compensating circuit 220 and the macroblock data of the motion-compensated video data P4 supplied thereto from the motion compensating circuit 222. This synthesized macroblock data is supplied through the switch 255 to the adding circuit 207. Accordingly, the adding circuit 207 subtracts the synthesized macroblock data from the macroblock data of the video data B5. Difference data obtained by this subtraction is encoded by circuits in the succeeding stage. The above-mentioned processing is effected on all macroblock data of the video data B5.

Video data P8 is to be encoded next. Before video data P8 is outputted from the selector 204, the video data P8 is stored in the frame memory 201, video data B7 is stored in the frame memory 202, and the video data I6 is stored in the frame memory 203.

In this case, the motion detecting circuit 205 generates motion vector data indicative of macroblocks of the video data B7 coincident with somewhere (macroblock data) of the video data B8 by detecting a motion of macroblocks of video data B7 stored in the frame memory 202 and macroblocks of the video data P8 stored in the frame memory 201. The motion vector data of every macroblock are used by the motion compensating circuit 220 when corresponding macroblock data provided within the video data I6 stored in the frame memory 221 are sequentially read out, i.e., motion-compensated. It is to be noted that the macroblock data of the video data I6 are compensated based on the motion vector data obtained from the video data P8 and B7.

As the macroblock data of the video data P8 is outputted from the selector 204, the motion compensating circuit 220 supplies the motion-compensated macroblock data of the video data I6 through the switch 225 to the adding circuit 207. Accordingly, the adding circuit 207 subtracts the motion-compensated macroblock data of the video data I6 from the macroblock data of the video data P8. Difference data thus obtained by the above subtraction is encoded by the respective circuits in the succeeding stage, and outputted through the output terminal 214. The above-mentioned processing is effected on all macroblock data of the video data P8. After the video data P8 has been encoded, the video data I6 stored in the frame memory 219 is stored in the frame memory 221.

During the above-mentioned processing, the encoded data from the quantizing circuit 211 is re-transformed by the inverse-quantizing circuit 215 and the IDCT circuit 216, and supplied to the adding circuit 217. The thus re-transformed difference data is added by the adding circuit 217 with motion-compensated macroblock data supplied thereto from the motion compensating circuit 220 through the switch 225, thereby converted into the macroblock data of the video data P8. The macroblock data of the video data P8 is supplied through the switch 218 to the frame memory 219. The above-mentioned processing is continuously carried out until the storage of the video data P8 in the frame memory 219 is finished.

Video data B7 is to be encoded next. Before the video data B7 is outputted from the selector 204, the video data B8 is stored in the frame memory 201, the video data B7 is stored in the frame memory 202, and the video data I6 is stored in the frame memory 203.

Then, the motion detecting circuit 205 generates motion vector data indicative of the macroblocks of the video data B7 coincident with somewhere (macroblock data) of the video data P8 by detecting a motion of macroblocks of the video data B7 stored in the frame memory 202 and the macroblocks of the video data P8 stored in the frame memory 201. The motion vector data of every macroblock are used by the motion compensating circuit 220 when the macroblock data provided within the video data P8 stored in the frame memory 219 are sequentially read out, i.e., motion-compensated.

On the other hand, the motion detecting circuit 206 generates motion vector data indicative of macroblocks of video data B7 coincident with somewhere (macroblock data) of the video data I6 by detecting a motion of macroblocks of the video data B7 stored in the frame memory 202 and macroblocks of the video data I6 stored in the frame memory 203. The motion vector data of every macroblock are used by the motion compensating circuit 220 when the macroblock data provided within the video data I6 stored in the frame memory 221 are sequentially read out, i.e., motion-compensated.

As the macroblock data of the video data B7 is outputted from the selector 204, the synthesizing circuit 224 outputs synthesized macroblock data of the macroblock data of the motion-compensated video data P8 from the motion compensating circuit 220 and the macroblock data of the motion-compensated video data I6 from the motion compensating circuit 222, and the synthesized macroblock data is supplied through the switch 225 to the adding circuit 207. Accordingly, the adding circuit 207 subtracts the synthesized macroblock data from the macroblock data of the video data B7. Difference data obtained by this subtraction is encoded by the respective circuits in the succeeding stage, and outputted through the output terminal 214. The above-mentioned processing is effected on all macroblock data of the video data B7. After the video data B7 has been encoded, the video data P8 stored in the frame memory 219 is stored in the frame memory 221.

As described above, video data of respective frames of GOP2 are encoded, and video data of other GOPs also are encoded similarly. The system controller 226 adds the motion vector data from the motion detecting circuits 220, 222, data indicative of motion-compensation types (or data indicative of subtracted data upon encoding) and picture type data to the compressed difference data supplied to the encoding circuit 213, and further adds data indicative of the starting portion of GOP to every GOP and data indicative of the encoding order to every GOP. The compressed difference data with these data added thereto is converted by the encoding circuit 213 in the form of the product code as described above, and outputted through the output terminal 214 for recording or transmission.

Examples of the motion detecting circuits 205, 206 shown in FIG. 1 will be described with reference to FIG. 4. A detecting circuit shown in FIG. 4 is adapted to execute a motion detection on the basis of a so-called block-matching. The frame memory 202 shown in FIG. 1 corresponds to a present frame memory 321 shown in FIG. 4, and the frame memories 201, 203 shown in FIG. 1 correspond to a reference frame memory 323 shown in FIG. 4.

The motion detecting circuit shown in FIG. 4 comprises the present frame memory 321 for storing therein video data of present frame, a reference frame memory 323 for storing therein video data of future or preceding frame (reference frame), an address shifting circuit 333 for sequentially supplying difference address data to the reference frame memory 323, an adding circuit 324 for subtracting the pixel data of the reference macroblock from the pixel data of a target macroblock of present frame, an absolute value generating circuit 325 for generating difference absolute value data of a subtracted result from the adding circuit 324, a latch circuit 327 for latching the absolute value data supplied thereto from the absolute value generating circuit 325, an adding circuit 326 for obtaining difference absolute value sum data of every reference macroblock by adding the output of the absolute value generating circuit 325 and the latched output of the latch circuit 327, a memory 328 for storing therein difference absolute value sum data supplied thereto from the adding circuit 326, a minimum value detecting circuit 329 for detecting a minimum value from the difference absolute value sum data stored in the memory 328, a motion vector detecting circuit 330 for obtaining one motion vector data corresponding to one target macroblock on the basis of the minimum difference absolute value sum data supplied thereto from the minimum value detecting circuit 329 and supplying the resultant motion vector data to a controller 329 and the system controller 226 shown in FIG. 1, and a controller 332 for controlling the address shifting circuit 333 on the basis of the minimum difference absolute value sum data supplied thereto from the minimum value detecting circuit 329 and the motion vector data supplied thereto from the motion vector detecting circuit 330 and writing of video data in the present frame memory 321 and reading of video data stored in the frame memory 321.

The motion vector detecting circuit 330 converts inputted difference absolute value sum data into motion vector data by reading motion vector data corresponding to inputted difference absolute value sum data, e.g., longitudinal and lateral shift amount data from a ROM (read-only memory) or the like, for example.

Under control of the controller 332, pixel data of macroblock (8×8 pixels or 16×16 pixels) serving as a target block is sequentially repeatedly read out from the present frame memory 32. On the other hand, under control of the controller 332, the address shifting circuit 333 sets a search area on the memory space of the reference frame memory 323, sets a reference block of the same size as that of the above macroblock within the set search area, and sequentially supplies address data for sequentially reading pixel data from the reference block to the reference frame memory 323. When the reading of pixel data from the set reference block is all ended, the address shifting circuit 333 shifts the position of the reference block within the search area by one pixel by supplying address data to the reference frame memory 323, and reads pixel data from the reference block shifted by one pixel by sequentially supplying address data to the reference frame memory 323.

The adding circuit 324 subtracts pixel data of the reference block read out from the reference frame memory 323 from the pixel data located within the target block read out from the present frame memory 321. A subtracted result from the adding circuit 324 is supplied to the absolute value generating circuit 325, in which it is converted into absolute value data, and supplied through the adding circuit 326 to the latch circuit 327. The latch circuit 327 latches added result from the adding circuit 326, i.e., difference absolute value sum data, whereby difference absolute value sum data between the target block within the present frame memory 321 and one reference block within the reference frame memory 323 are sequentially stored in the memory 328. Then, finally, difference absolute value sum data of the number corresponding to a large number of target blocks set within the search area with a shift of each pixel are stored in the memory 328.

When all calculations of the pixel data of one target macroblock and the pixel data of a plurality of reference macroblocks within one search area are finished, the minimum value detecting circuit 329 selects difference absolute value sum data of minimum value from all difference absolute value sum data located within the memory 328. Then, the minimum value detecting circuit 329 supplies selected difference absolute value sum data to the motion vector detecting circuit 330, and also supplies a control signal to the controller 332 such that the processing of the next target macroblock is started.

The difference absolute value sum data from the minimum value detecting circuit 329 is supplied to the motion vector detecting circuit 330. The motion vector detecting circuit 330 obtains motion vector data corresponding to the difference absolute value sum data from the minimum value detecting circuit 329. The motion vector data obtained in the motion vector detecting circuit 330 is supplied through an output terminal 331 to the motion compensating circuits 220, 222 and the system controller 226 shown in FIG. 1. Having set the search area by a similar procedure, the controller 332 controls the address shifting circuit 333 and the present frame memory 321 in such a manner that pixel data located within the next target macroblock and pixel data within the reference macroblock are calculated one more time.

U.S. Pat. No. 4,897,720 describes the above block-matching technique.

The motion decoder for decoding data series encoded by the motion encoder shown in FIG. 1 will be described with reference to FIG. 2.

The motion decoder shown in FIG. 2 comprises an expanding block for expanding a compressed data series, a motion-compensating block, an adding circuit 413 for adding an output of the expanding block and an output of the motion-compensating block, a switch 405 for selectively supplying the output of the expanding block and the output of the adding circuit 413 to the above motion-compensating block, and a system controller 414 for controlling the expanding block and the motion-compensating block and controlling the switch 405 by supplying a switching control signal to the switch 405.

The expanding block comprises a decoding circuit 401 for error-correcting the compressed data supplied thereto through an input terminal 400 by use of an inner parity and an outer parity, extracting motion vector data added upon encoding, data indicative of motion-compensation type, picture type data, data indicative of a starting portion of GOP, and data indicative of encoding order, and supplying these extracted data to the system controller 414, a VLC decoder for decoding variable-length-coded outputs from the decoding circuit 401 to provide original quantized coefficient data, a re-quantizing circuit 403 for re-quantizing the coefficient data supplied thereto from the VLC decoder 402 to provide the coefficient data processed by DCT, and an IDCT circuit 404 for inverse-discrete-cosine-transforming the coefficient data supplied thereto from the re-quantizing circuit 403 to provide original data.

The motion-compensating block comprises a frame memory 415 for sequentially storing decoded intraframe-coded data supplied thereto from the IDCT circuit 404 through the switch 404 or added output supplied thereto from the adding circuit 413 through the switch 405 in response to a write/read control signal supplied thereto from the system controller 414, a frame memory 408 for sequentially storing data read out from the frame memory 407 in response to a write/read control signal supplied thereto from the system controller 414, a forward direction motion compensating circuit 409 for reading the macroblock data of the frame memory indicated by the motion vector data supplied thereto from the system controller 414 and supplying the thus read out macroblock data to a switching circuit 412 as motion-compensated macroblock data, a bidirectional motion compensating circuit 410 for reading macroblock data of the frame memories 407, 408 indicated by the two motion vector data supplied thereto from the system controller 414, weighting the macroblock data thus read out, obtaining one synthesized macroblock data by synthesizing two weighted macroblock data and supplying the synthesized macroblock data to the switching circuit 412 as motion-compensated macroblock data, a backward direction motion compensating circuit 411 for reading macroblock data of the frame memory 408 shown by the motion vector data supplied thereto from the system controller 414 and supplying the macroblock data thus read out to the switching circuit 412 as motion-compensated macroblock data, and a switch 412 for selectively outputting outputs from the forward direction motion compensating circuit 409, the bidirectional motion compensating circuit 410 and the backward direction motion compensating circuit 411 in response to a switching control signal supplied thereto from the system controller 414.

An operation of the motion decoder shown in FIG. 2 will be described below.

Reproduced or transmitted compressed data is supplied through the input terminal 400 to this motion decoder and thereby sequentially decoded by the decoding circuit 401, the VLC decoder 402, the re-quantizing circuit 403 and the IDCT circuit 404. At that time, the decoding circuit 401 extracts the motion vector data, the data indicative of motion compensation type, the data indicative of picture type, the data indicative of the starting portion of GOP, and the data indicative of encoding order, and supplies these extracted data to the system controller 414.

A manner in which the data expanded by the expanding block is decoded by the motion-compensating block, the adding circuit 413, the switch 405 and the system controller 414 will be described with reference to FIG. 2 and FIGS. 3A to 3C. Meanings of reference symbols and letters in FIGS. 3A through 3C were already described when the operation of the motion encoder has been described so far, and therefore need not be described.

Data are supplied to the input terminal 400 in the sequential order shown in FIG. 3B. Initially, the IDCT circuit 404 outputs the macroblock data of the intraframe-coded video data I6. The system controller 414 supplies the switching control signal to the switch 405 so that the switch 405 connects a movable contact c to an intra-side fixed contact a. Accordingly, the macroblock data of the video data I6 outputted from the IDCT circuit 404 is outputted through the output terminal 406, and supplied to the frame memory 407, in which it is stored in response to the write/read control signal supplied thereto from the system controller 414.

When the macroblock data of the video data I6 is stored in the frame memory 407, difference data of the next video data B5 is outputted from the IDCT circuit 404. The system controller 414 supplies the switching control signal to the switch 405 so that the switch 405 connects the movable contact c to an inter-side fixed contact b. The system controller 414 further supplies the switching control signal to the switch 412 so that the switch 412 connects a movable contact d to a fixed contact b. On the other hand, the bidirectional motion compensating circuit 410 reads macroblock data of corresponding video data I6 from the frame memory 414 and macroblock data of corresponding video data P4 from the frame memory 408 in response to two motion vector data sequentially supplied thereto from the system controller 414, weights and synthesizes the two macroblock data thus read out to thereby obtain one synthesized macroblock data.

Therefore, at the time the difference data of the video data B5 is outputted from the IDCT circuit 404 and supplied to the adding circuit 413, the motion-compensated macroblock data (synthesized macroblock data) from the bidirectional motion compensating circuit 410 is supplied through the switch 412 to the adding circuit 413. Thus, the adding circuit 413 adds the difference data of the video data B5 and the synthesized macroblock data which results from synthesizing the macroblock data of the video data I6 and P4 with the result that the macroblock data of the video data B5 is decoded. Specifically, as shown by an arrow in FIG. 3C, the video data B5 is decoded by the video data P4 and the video data I6.

As already explained in the description of the motion encoder, the macroblock data of the video data B5 is encoded by subtracting the synthesized macroblock data, which results from synthesizing the macroblock data of the video data P4 and the macroblock data of the video data I6, from the macroblock data of the video data B5. Therefore, in order to obtain the macroblock data of the video data B5 by decoding, it is sufficient to add the synthesized macroblock data, which results from synthesizing the macroblock data of the video data P4 and the macroblock data of the video data I6, to the difference data of the expanded video data B5.

When all macroblock data of the video data B5 are decoded, the video data I6 stored in the frame memory 407 is stored in the frame memory 408 in response to the write/read control signal from the system controller 414.

When the macroblock data of the video data I6 is stored in the frame memory 408, the difference data of the video data P8 is outputted from the IDCT circuit 404 next. The system controller 414 supplies the switching control signal to the switch 405 so that the switch 405 connects the movable contact c to the inter-side fixed contact b. Further, the system controller 414 supplies the switching control signal to the switch 412 so that the switch 412 connects the movable contact d to the fixed contact c. On the other hand, the backward direction motion compensating circuit 411 reads out the macroblock data of the corresponding video data I6 from the frame memory 408 in response to the motion vector data sequentially supplied thereto from the system controller 414.

Accordingly, at the time the difference data of the video data P8 is outputted from the IDCT circuit 404 and supplied to the adding circuit 413, the motion-compensated macroblock data from the backward direction motion compensating circuit 411 is supplied through the switch 412 to the adding circuit 413. Thus, the adding circuit 413 adds the difference data of the video data P8 and the motion-compensated macroblock data obtained from the video data I6 so that the macroblock data of the video data P8 is decoded. That is, the video data P8 is decoded by the video data I6. In FIGS. 3A to 3C, arrows indicative of the decoding of the P picture are not shown.

As already described in the description of the operation of the motion encoder, the encoding of the macroblock data of the video data P8 is carried out by subtracting the motion-compensated macroblock data of the video data I6 from the macroblock data of the image data P8. Therefore, in order to obtain the macroblock data of the video data P8 by decoding, it is sufficient to add the motion-compensated macroblock data of the video data I6 to the difference data of the expanded video data P8.

The macroblock data of the decoded video data P8 is outputted through the output terminal 406, and supplied to the frame memory 407. Accordingly, such macroblock data of the decoded video data P8 is stored in the frame memory 407 in response to the write/read control signal from the system controller 414. Therefore, at the time the decoding of the video data P8 is ended, the video data P8 is stored in the frame memory 407, and the video data I6 is stored in the frame memory 408.

Next, the difference data of video data B7 is outputted from the IDCT circuit 404. The system controller 414 supplies the switching control signal to the switch 405 so that the switch 405 connects the movable contact c to the inter-sided fixed contact b. Further, the system controller 414 supplies the switching control signal to the switch 412 so that the switch 412 connects the movable contact d to the fixed contact b. On the other hand, the bidirectional motion compensating circuit 410 reads out the macroblock data of the corresponding video data P8 from the frame memory 407 and the macroblock data of the corresponding video data I6 from the frame memory 408 in response to the two motion vector data sequentially supplied thereto from the system controller 414, and weights and synthesizes the two macroblock data thus read out to thereby obtain one synthesized macroblock data.

Accordingly, at the time the difference data of the video data B7 is outputted from the IDCT circuit 404 and supplied to the adding circuit 413, the motion-compensated macroblock data (synthesized macroblock data) from the bidirectional motion compensating circuit 412 is supplied through the switch 412 to the adding circuit 413. Thus, the adding circuit 413 adds the difference data of the video data B7 and the synthesized macroblock data which results from synthesizing the macroblock data of the video data P8 and the video data I6 with the result that the macroblock data of the video data B7 is decoded. That is, as shown by arrows in FIG. 3C, the video data B7 is decoded by the video data P8 and the video data I6.

As already described in the description of the operation of the motion encoder, the encoding of the macroblock data of the video data B7 is carried out by subtracting the synthesized macroblock data of the macroblock data of the video data P8 and the macroblock data of the video data I6 from the macroblock data of the video data B7. Therefore, in order to obtain the macroblock data of the video data B7 by decoding, it is sufficient to add the synthesized macroblock data of the macroblock data of the video data P8 and the macroblock data of the video data I6 to the difference data of the expanded video data I6.

As described above, video data of frames of GOPs are decoded sequentially. In the example shown in FIGS. 3A to 3C, when decoded video data of frames of GOPs are read out in the sequential order of B1, I2, B3, P4, B5, I6, B7, P8, B9, I10, B11 P12, video data in the GOP are rearranged. It is to be noted that video data within GOPs are rearranged in the order of true frames before being encoded while the order of GOPs is not rearranged.

The motion encoder (see FIG. 1) and the motion decoder (see FIG. 2) are used in a recording and reproducing apparatus such as a VTR or a disk drive, and the information transmitting apparatus such as a communication system. There is then the problem caused when data is reproduced in the reverse direction by the recording and reproducing apparatus or when information transmitted with frames whose orders are reversed in the transmission side is reproduced by the reception side.

A problem caused when data is reproduced in the reverse direction by the recording and reproducing apparatus will be described with reference to FIGS. 5A to 5C.

FIGS. 5A to 5C show a manner in which data encoded by the motion encoder shown in FIG. 1 and recorded on the recording medium by the recording system is reproduced by the reproducing system in the direction opposite to the normal reproducing direction and decoded by the motion decoder shown in FIG. 2 according to the recording and reproducing apparatus. Reference numerals and symbols shown in FIGS. 5A to 5C are similar to those of FIGS. 3A to 3C, and therefore need not be described. FIGS. 5A and 5B are the same as FIGS. 3A and 3B, i.e., show a manner in which data are inputted and encoded. FIGS. 5A and 5B are illustrated in order to supplement the description of FIG. 5C, and therefore need not be described in detail.

If data encoded in the order shown in FIG. 5B and which are recorded on the recording medium in the sequential order of GOP1, GOP2, GOP3 are shifted (or rotated) in the direction opposite to the shifting direction (or rotating direction) of the recording medium upon recording, and reproduced in the opposite direction, then recorded data are reproduced in the sequential order of GOP3, GOP2, GOP1 as shown in FIG. 5C.

Accordingly, when data are decoded by the motion decoder shown in FIG. 2, as shown in FIG. 5C, the video data B9 of GOP3 is decoded by use of video data of P picture of GOP4, not shown, and video data I10 of GOP3, video data B11 of GOP3 is decoded by use of video data I10 of GOP3 and video data P12 of GOP3, video data B5 of GOP2 is decoded by use of video data P12 of GOP3 and video data I6 of GOP2, video data B7 of GOP2 is decoded by use of video data I6 of GOP2 and video data P8 of GOP2, video data B1 of GOP1 is decoded by use of video data P8 of GOP2 and video data I2 of GOP1, and video data B3 of GOP1 is decoded by use of video data I2 of GOP1 and video data P4 of GOP1.

A manner in which video data B1 through B11 are encoded by video data will be described and confirmed one more time with reference to FIG. 5A (as already described with reference to FIG. 3A).

As shown in FIG. 5A, video data B1 of GOP1 is decoded by use of video data of P picture of GOP0, not shown, and video data I2 of GOP1, video data B3 of GOP1 is decoded by use of video data I2 of GOP1 and video data P4 of GOP1, video data B5 of GOP2 is decoded by video data P4 of GOP1 and video data I6 of GOP2, video data B7 of GOP2 is decoded by use of video data I6 of GOP2 and video data P8 of GOP2, video data B9 of GOP3 is decoded by use of video data P8 of GOP2 and video data I10 of GOP3, and video data B11 of GOP3 is decoded by use of video data I10 of GOP3 and video data P12 of GOP3.

As is clear from the above description, of the video data B1 through B11 shown in FIG. 5C, since the video data B9, B5 and B1 are decoded by use of video data different from those used in encoding, a picture quality of reproduced pictures decoded by use of video data which are not deeply related to the video data is quite poor.

As described above, if recorded data are reproduced in the opposite direction when the B picture is encoded by use of P picture of preceding GOP and I picture of present GOP, then video data are decoded by use of video data different from those used in the encoding, resulting in the above problem being caused. However, a manner in which the problem occurs is not limited to the above description. That is, if video data is encoded by use of video data belonging to GOPs which are ahead of or behind, i.e., future or past GOP of GOP to which the corresponding video data belongs, then when video data is reproduced in the opposite direction, inputted video data which are ahead of or behind the GOP to which the corresponding GOP belongs, i.e., video data which belong to future or past GOPs are used. As a consequence, video data different from those used in the encoding are used, resulting in the similar problem being caused.

Troublesome patters will be described below with reference to B picture and P picture belonging to GOP2.

Troublesome pattern in B picture will be described initially.

If B picture belonging to GOP2, for example, is encoded by use of I or P picture belonging to GOP1, then when such B picture is reproduced in the reverse direction, the corresponding B picture is decoded by use of I or P picture belonging to GOP3.

If B picture belonging to GOP2 is encoded by use of I or P picture belonging to GOP3, then when such B picture is reproduced in the reverse direction, the corresponding B picture is decoded by use of I or P picture belonging to GOP1.

If B picture belonging to GOP2 is encoded by use of I or P picture belonging to GOP1 and I or P picture belonging to GOP2, then when such B picture is reproduced in the reverse direction, the corresponding B picture is decoded by use of I or P picture belonging to GOP3 and I or P picture belonging to GOP2.

If B picture belonging to GOP2 is encoded by I or P picture belonging to GOP3 and I or P picture belonging to GOP2, then when such B picture is reproduced in the reverse direction, the corresponding B picture is decoded by use of I or P picture belonging to GOP1 and I or P picture belonging to GOP2.

Troublesome patterns in P picture will be described next.

If P picture belonging to GOP2, for example, is encoded by use of I or P picture belonging to GOP1, then when such P picture is reproduced in the reverse direction, the corresponding P picture is decoded by use of I or P picture belonging to GOP3.

If P picture belonging to GOP2 is encoded by use of I or P picture belonging to GOP1, then when such P picture is reproduced in the reverse direction, the corresponding P picture is decoded by use of I or P picture belonging to GOP3.

This is also true in the case of the information transmitting apparatus. If the information transmission side transmits video data with arrangement of GOP data reversed and such transmitted video data is received at the transmission side, there then arises a similar problem.

SUMMARY OF THE INVENTION

In view of the aforesaid aspects, it is an object of the present invention to provide a video information decoding apparatus and a video information reproducing apparatus in which all encoded video data can be satisfactorily decoded and a satisfactory reproduced image can be obtained even when the arrangement of GOP data is made opposite to that in the encoding.

According to an aspect of the present invention, there is provided a video data decoding apparatus for decoding data composed of a plurality of video data in the decoding unit including video data encoded by use of future or past or preceding and succeeding video data with respect to at least video data to be encoded. This video data decoding apparatus comprises first decoding means for decoding a plurality of video data of the decoding unit, second decoding means for decoding a plurality of video data of the decoding unit, rearranging means for obtaining at least two kinds of first and second arrangements by rearranging a plurality of video data of the decoding unit at every decoding unit, and selectively supplying a plurality of video data of the first arrangement and a plurality of video data of the second arrangement to the first and second decoding means, selecting means for selecting a plurality of decoded video data of the decoding unit from the first decoding means and a plurality of decoded video data of the decoding unit from the second decoding means, memory means for storing therein an output from the selecting means, and control means for inhibiting the selecting means from selecting the decoding unit containing video data decoded by use of video data different from video data used for decoding upon encoding of a plurality of inputted video data of the decoding unit when the order in which a plurality of video data of the decoding unit are inputted is opposite to the order in which a plurality of video data of the decoding unit are encoded upon encoding.

According to the present invention, when a plurality of video data are inputted at the decoding unit in the order opposite to the order in which a plurality of video data in the decoding unit are encoded upon encoding, at least the selecting means is inhibited from selecting decoding unit containing decoded video data decoded by use of video data different from video data used in the encoding. Therefore, only the video data of the decoding unit containing the video data decoded by use of video data different from video data used in the encoding is eliminated, and only correct video data can be outputted.

BRIEF DESCRIPTION OF THE DRAWINGS

FIGS. 3A to 3C are schematic diagrams used to explain a manner in which video data is predicted and reproduced in the positive direction in the conventional information transmitting apparatus and the recording and reproducing apparatus using the motion encoder shown in FIG. 1 and the motion decoder shown in FIG. 2 wherein:

FIG. 3A is a diagram showing pictures used when a motion encoder 250 shown in FIG. 1 encodes video data;

FIG. 3B is a diagram showing arrangement of data outputted from the motion encoder 250 shown in FIG. 1; and FIG. 3C is a diagram showing pictures used when GOP data supplied in the positive direction are decoded by a motion decoder (motion decoders 13, 14 in the embodiment) shown in FIG. 2;

FIGS. 5A to 5C are schematic diagrams used to explain a manner in which video data is predicted and reproduced in the reverse direction in the conventional information transmitting apparatus and the recording and reproducing apparatus using the motion encoder shown in FIG. 1 and the motion decoder shown in FIG. 2 wherein:

FIG. 5A is a diagram showing pictures used when a motion encoder 250 shown in FIG. 1 encodes video data;

FIG. 5B is a diagram showing arrangement of data outputted from the motion encoder 250 shown in FIG. 1; and FIG. 5C is a diagram showing pictures used when GOP data supplied in the positive direction are decoded by a motion decoder (motion decoders 13, 14 in the embodiment) shown in FIG. 2;

FIGS. 6A through 6I are schematic diagrams, partly in block form, used to explain an outline of the video information decoding apparatus and the video information reproducing apparatus according to the present invention wherein:

FIG. 6A is a diagram showing a relationship between video data of GOP to be encoded and video data of other GOP used to encode the video data;

FIG. 6B is a diagram showing video data of GOP supplied to an input terminal 100 of the video information decoding apparatus shown in FIG. 6 and which is arranged in the arrangement opposite to that in the encoding;

FIG. 6C is a diagram showing GOP data in which the arrangement of GOP is rearranged by a rearrangement means 101 of the video information decoding apparatus shown in FIG. 6 and which is decoded by a decoding circuit 102;

FIG. 6D is a diagram showing GOP data in which the arrangement of GOP is rearranged by a rearrangement means 101 of the video information decoding apparatus shown in FIG. 6 and which is decoded by a decoding circuit 103;

FIG. 6E is a diagram showing GOP data selected by a selecting means 104 of the video information decoding apparatus shown in FIG. 6 when video data used in the encoding is future video data;

FIG. 6F is a diagram showing GOP data selected by a selecting means 104 of the video information decoding apparatus shown in FIG. 6 when video data used in the encoding is future video data;

FIG. 6G is a diagram showing GOP data selected by a selecting means 104 of the video information decoding apparatus shown in FIG. 6 when video data used in the encoding is past video data;

FIG. 6H is a diagram showing GOP data selected by a selecting means 104 of the video information decoding apparatus shown in FIG. 6 when video data used in the encoding is past video data; and FIG. 6I is a diagram showing video data outputted from a memory means 105;

FIG. 9 is a table showing contents of table data 21c shown in FIG. 7;

FIGS. 10A through 10V are timing charts used to explain a manner in which video data is inputted to and outputted from the memory 12 shown in FIG. 8 when the arrangement of inputted GOP data is in the positive direction wherein:

FIG. 10A is a diagram showing GOP data supplied to a data input terminal 50 of the memory 12 shown in FIG. 8;

FIG. 10B is a diagram showing a write enable signal supplied to a write enable signal input terminal 55 of the memory 12 shown in FIG. 8;

FIG. 10C is a diagram showing GOP data stored in a FIFO memory 63 of the memory 12 shown in FIG. 8;

FIG. 10D is a diagram showing a read enable signal supplied to a read enable signal input terminal 59 of the memory 12 shown in FIG. 8;

FIG. 10E is a diagram showing GOP data read out from the FIFO memory 63 of the memory 12 shown in FIG. 8;

FIG. 10F is a diagram showing a write enable signal supplied to a write enable signal input terminal 56 of the memory 12 shown in FIG. 8;

FIG. 10G is a diagram showing GOP data stored in a FIFO memory 64 of the memory 12 shown in FIG. 8;

FIG. 10H is a diagram showing a read enable signal supplied to a read enable signal input terminal 60 of the memory 12 shown in FIG. 8;

FIG. 10I is a diagram showing GOP data read out from the FIFO memory 64 of the switch 12 shown in FIG. 8;

FIG. 10R is a diagram showing a switching control signal supplied to a switching control signal input terminal 69 of the memory 12 shown in FIG. 8;

FIG. 10S is a diagram showing GOP data outputted from a switch 67 of the memory 12 shown in FIG. 8;

FIG. 10U is a diagram showing a switching control signal supplied to a switching control signal input terminal 72 of the memory 12 shown in FIG. 8; and FIG. 10V is a diagram showing GOP data outputted from the memory 12 shown in FIG. 8;

FIGS. 11A through 11Q are timing charts used to explain a manner in which video data is inputted to and outputted from the memory 12 shown in FIG. 8 when the arrangement of inputted GOP data is in the reverse direction wherein:

FIG. 11A is a diagram showing GOP data supplied to a data input terminal 50 of the memory 12 shown in FIG. 8;

FIG. 11B is a diagram showing a write enable signal supplied to a write enable signal input terminal 55 of the memory 12 shown in FIG. 8;

FIG. 11C is a diagram showing GOP data stored in a FIFO memory 63 of the memory 12 shown in FIG. 8;

FIG. 11D is a diagram showing a read enable signal supplied to a read enable signal input terminal 59 of the memory 12 shown in FIG. 8;

FIG. 11E is a diagram showing GOP data read out from the FIFO memory 63 of the memory 12 shown in FIG. 8;

FIG. 11F is a diagram showing a write enable signal supplied to a write enable signal input terminal 56 of the memory 12 shown in FIG. 8;

FIG. 11G is a diagram showing GOP data stored in a FIFO memory 64 of the memory 12 shown in FIG. 8;

FIG. 11H is a diagram showing a read enable signal supplied to a read enable signal input terminal 60 of the memory 12 shown in FIG. 8;

FIG. 11I is a diagram showing GOP data read out from the FIFO memory 64 of the switch 12 shown in FIG. 8;

FIG. 11J is a diagram showing the write enable signal supplied to the write enable signal input terminal 57 of the memory 12 shown in FIG. 8;

FIG. 11K is a diagram showing GOP data stored in a FIFO memory 65 of the memory 12 shown in FIG. 8;

FIG. 11L is a diagram showing a read enable signal supplied to a read enable signal input terminal 61 of the memory 12 shown in FIG. 8;

FIG. 11M is a diagram showing a write enable signal supplied to the write enable signal input terminal 58 of the memory 12 shown in FIG. 8;

FIG. 11N is a diagram showing a write enable signal supplied to a write enable signal input terminal 58 of the memory 12 shown in FIG. 8;

FIG. 11O is a diagram showing GOP data stored in a FIFO memory 66 of the memory 12 shown in FIG. 8;

FIG. 11P is a diagram showing a read enable signal supplied to a read enable signal input terminal 62 of the memory 12 shown in FIG. 8; and FIG. 11Q is a diagram showing GOP data read out from the FIFO memory 66 of the memory 12 shown in FIG. 8;

FIGS. 12E' through 12W are timing charts used to explain a manner in which video data is inputted to and outputted from the memory 12 shown in FIG. 8 when the arrangement of inputted GOP data is in the reverse direction wherein:

FIG. 12E' is a diagram showing GOP data read out from the FIFO memory 63 of the memory 12 shown in FIG. 8, and showing the same data as that of FIG. 11E;

FIG. 12I' is a diagram showing GOP data read out from the FIFO memory 64 of the memory 12 shown in FIG. 8, and showing the same data as that of FIG. 11I;

FIG. 12M' is a diagram showing GOP data read out from the FIFO memory 65 of the memory 12 shown in FIG. 8, and showing the same data as that of FIG. 11M;

FIG. 12Q' is a diagram showing GOP data read out from the FIFO memory 65 of the memory 12 shown in FIG. 8, and showing the same ass that of FIG. 11M;

FIG. 12R is a diagram showing a switching control signal supplied to the switching control signal input terminal 69 of the memory 12 shown in FIG. 8;

FIG. 12S is a diagram showing GOP data outputted from the switch 67 of the memory 12 shown in FIG. 8;

FIG. 12T is a diagram showing GOP data outputted from the switch 68 of the memory 12 shown in FIG. 8;

FIG. 12U is a diagram showing a switching control signal supplied to the switching control signal input terminal 72 of the memory 12 shown in FIG. 8;

FIG. 12V is a diagram showing GOP data outputted from the switch 70 of the memory 12 shown in FIG. 8; and FIG. 12W is a diagram showing GOP data outputted from the switch 71 of the memory 12 shown in FIG. 8;

FIGS. 13A through 13F are schematic diagrams used to explain differences of data lengths used upon writing and reading in the memory 12 shown in FIG. 8 wherein:

FIG. 13A is a diagram showing a write period and a read period in FIGS. 10A through 10V to FIGS. 12E' to 12W;

FIG. 13B is a diagram showing data used in the read period shown in FIGS. 10A through 10V to FIGS. 12E' to 12W;

FIG. 13C is a diagram showing a write period and a read period in FIGS. 10A through 10V to FIGS. 12E' to 12W;

FIG. 13D is a diagram used to explain the case that the lengths of the write period and the read period in FIGS. 10A through 10V to FIGS. 12E' through 12W become equal to each other in accordance the specifications of the motion decoders 13, 14;

FIG. 13E is a diagram showing a data arrangement used when data are inputted to the motion decoders 13, 14; and FIG. 13F is a diagram showing a data arrangement used when data are outputted from the motion decoders 13, 14;

FIGS. 14A through 14J are diagrams showing timings obtained when the magnetooptical disk drive shown in FIG. 7 reproduces video data at +1 time normal playback speed mode wherein:

FIG. 14A is a diagram showing an output from the decoding circuit 11 shown in FIG. 7;

FIG. 14B is a diagram showing a reset signal supplied to the memory 12 from the system controller 17 shown in FIG. 7;

FIG. 14C is a diagram showing a write enable signal supplied to the memory 12 from the system controller 17 shown in FIG. 7;

FIG. 14D is a diagram showing a read output of the motion decoder 13 side shown in FIG. 7;

FIG. 14F is a diagram showing an output of the motion decoder 13 shown in FIG. 7;

FIG. 14H is a diagram showing a switching control signal supplied to the switch 15 from the system controller 17 shown in FIG. 7; and FIG. 14J is a diagram showing a read output of the memory 16 shown in FIG. 7;

FIGS. 15A through 15J are diagrams showing timings obtained when the magnetooptical disk drive shown in FIG. 7 reproduces video data at −1 time normal playback speed mode wherein:

FIG. 15A is a diagram showing an output from the decoding circuit 11 shown in FIG. 7;

FIG. 15B is a diagram showing a reset signal supplied to the memory 12 from the system controller 17 shown in FIG. 7;

FIG. 15C is a diagram showing a write enable signa supplied to the memory 12 from the system controller 17 shown in FIG. 7;

FIG. 15D is a diagram showing a read output of the motion decoder 13 side shown in FIG. 7;

FIG. 15E is a diagram showing a read output of the motion decoder 14 side shown in FIG. 7;

FIG. 15F is a diagram showing an output of the motion decoder 13 shown in FIG. 7;

FIG. 15G is a diagram showing an output of the motion decoder 14 shown in FIG. 7;

FIG. 15H is a diagram showing a switching control signal supplied to the switch 15 from the system controller 17 shown in FIG. 7;

FIG. 15I is a diagram showing an output from the switch shown in FIG. 7; and

FIG. 15J is a diagram showing a read output of the memory 16 shown in FIG. 7;

DETAILED DESCRIPTION OF THE PREFERRED EMBODIMENTS

Figure 1:
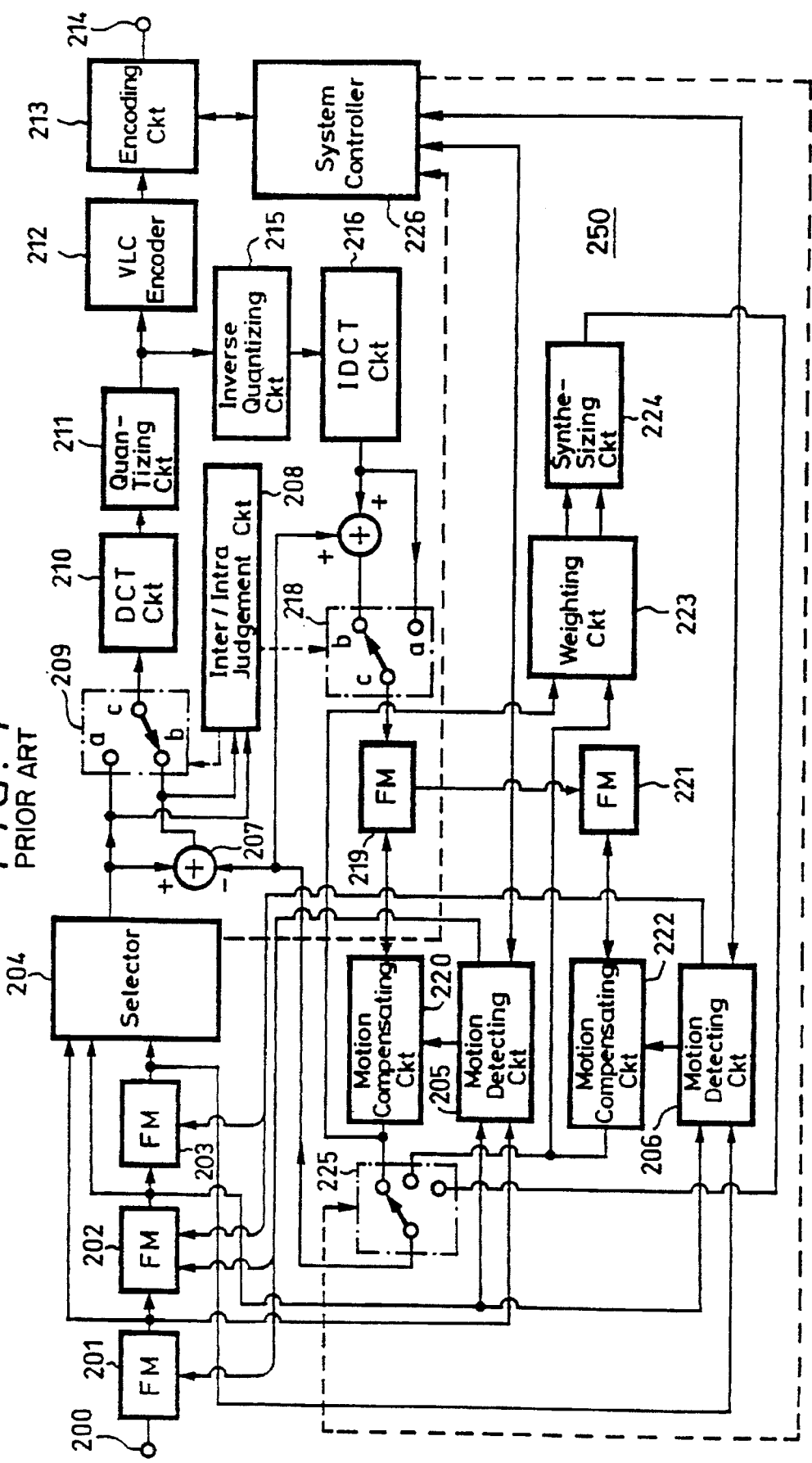
FIG. 1 is a block diagram showing an example of a motion encoder used in a conventional information transmitting apparatus and a conventional recording and reproducing apparatus.

A video data decoding apparatus and a video data reproducing apparatus according to the present invention will hereinafter be described with reference to FIGS. 6A through 6I to FIGS. 16A, 16B.

FIGS. 6A through 6I are diagrams, partly in block form, used to explain a first embodiment of the present invention. A block diagram is shown on the right-hand side of a sheet of drawing, and inputted and outputted data are illustrated on the left-hand side thereof. Reference numerals "n−2" through "n+2" show GOPs, and numerical values in respective reference numerals show the orders of the encoding.

Figure 6:
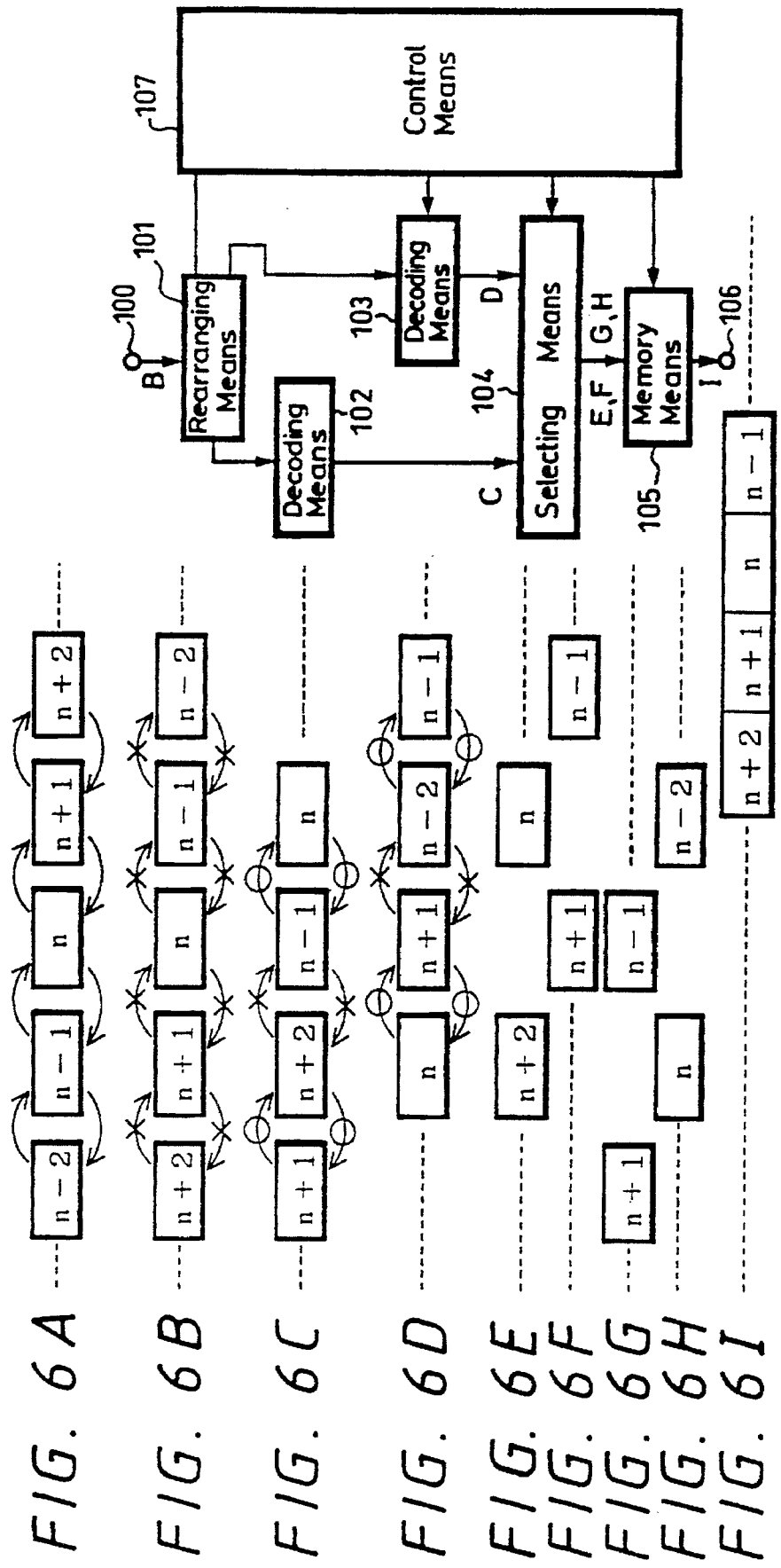

As shown in FIGS. 6A through 6I, according to this embodiment, data encoded as shown in FIG. 6A is transmitted or reproduced in the order opposite to the inputted order upon encoding as shown in FIG. 6B. Data supplied through an input terminal 100 is rearranged in GOP by a rearrangement means 101 as shown in FIGS. 6C and 6D under control of a control means 107. First arrangement data (see FIG. 6C) obtained by such rearrangement is supplied to a motion decoder 102, and second arrangement data (see FIG. 6D) obtained by the rearrangement is supplied to a motion decoder 103. Data decoded by the motion decoders 102, 103 are supplied to a selecting means 104, and the selecting means 104 selects and outputs only video data of correctly-decoded GOP from the first and second arrangement data as shown in FIGS. 6E, 6F or FIGS. 6G, 6H. The output from the selecting means 104 is temporarily stored in a memory means 105, and data is rearranged and outputted as shown in FIG. 6I. Therefore, data series can be rearranged by only video data of GOP other than GOPs including erroneously-decoded pictures included in decoded data series if the order in which video data are inputted to the rearrangement means 101 is different from that in the encoding, and hence all encoded video data can be obtained satisfactorily.

First and second examples shown in FIGS. 6A through 6I will be described.

The first example is the case that video data to be encoded is encoded by video data of preceding (past) GOP which is ahead of the GOP to which the above video data belongs. In FIGS. 6A through 6D, arrows showing right-hand directions correspond to the first example. The second example is the case that video data to be encoded is encoded by video data of future GOP which is behind the GOP to which the above video data belongs. In FIGS. 6A through 6D, arrows showing left-hand directions correspond to the second example. Video data shown by arrows indicate video data to be encoded, and video data from which arrows are drawn out indicate video data which are used when the video data are encoded.

In the first example, of the arrows shown, only the right-hand direction arrows will be referred to. As shown in the right-hand direction arrows in FIG. 6A, upon encoding, one or a plurality of video data in GOPn−1 are encoded by use of video data of GOPn−2, one or a plurality of video data in GOPn are encoded by use of video data of GOPn−1, . . . . , one or a plurality of video data in GOPn+2 are encoded by use of video data of GOPn+1.

Accordingly, when video data is reproduced or transmitted in the reverse direction, as shown in FIG. 6B, the GOPs are arranged in the direction opposite to that in the encoding. Therefore, as is clear from the right-hand direction arrows in FIG. 6B, one or a plurality of video data in GOPn+1 is encoded by use of video data in GOPn+2, one or a plurality of video data in GOPn are encoded by use of video data in GOPn+2, one or a plurality of video data in GOPn−1 are encoded by use of video data in GOPn, and one or a plurality of video data in GOPn−2 are encoded by use of video data in GOPn−1. Accordingly, of all decoded image data, B pictures and P pictures other than B pictures and P pictures encoded within the GOPs are decoded by video data different from those used in the encoding.

However, the rearrangement means 101 rearranges video data under control of the control means 107 such that video data are arranged in the two kinds of arrangements as shown in FIGS. 6C and 6D. Video data arranged in the arrangement shown in FIG. 6C is supplied to the decoding means 102, and video data arranged in the second arrangement shown in FIG. 6D is supplied to the decoding means 103.

As shown in FIG. 6C, of outputs decoded by the decoding means 102 as shown by right-hand direction arrows, arrows showing video data in GOPn+2 and video data in GOPn are affixed with "open circles". "Open circles" show that, because GOP data are rearranged by the rearrangement means 101, video data in GOPn+2 and video data of GOPn are correctly decoded by use of the same video data as those used in the encoding. GOPs shown by arrow with crosses show that video data contain video data decoded by use of video data different from those used in the encoding.

As shown in FIG. 6D, of outputs decoded by the decoding means 103 as shown by right-hand direction arrows, arrows showing video data in GOPn+1 and video data in GOPn−1 are affixed with "open circles". "Open circles" show that, because GOP data are rearranged by the rearrangement means 101, video data in GOPn+1 and video data of GOPn−1 are correctly decoded by use of the same video data as those used in the encoding. GOPs shown by arrow with crosses show that video data contain video data decoded by use of video data different from those used in the encoding.

A decoded output from the decoding means 102 is supplied to the selecting means 104 in which, as shown in FIG. 6E, GOPn−1 and GOPn+1 including video data decoded by use of video data different from those used in the encoding are eliminated from GOPn+1, GOPn+2, GOPn−1, GOPn shown in FIG. 6C. A decoded output from the decoding means 103 is supplied to the selecting means 104 in which, as shown in FIG. 6F, GOPn and GOPn+2 including video data decoded by video data different from those used in the encoding are eliminated from GOPn, GOPn+1, GOPn−2, GOPn−1 shown in FIG. 6D. As a consequence, the output from the selecting means 104 is temporarily stored in the memory means 105, and read out in the sequential order in which it is supplied to the input terminal 100 as shown in FIG. 6I. This output is outputted from an output terminal 106 as reverse-direction reproduced output. Specifically, as shown in FIG. 6I, video data in the output become only correctly-decoded video data by use of the same video data as those used in the encoding.

In the second example, of the arrows shown, only arrows showing left-hand directions will be referred to. As is clear from the left-hand direction arrows, upon encoding, one or a plurality of video data in GOPn−2 are encoded by use of video data in GOPn−1, one or a plurality of video data in GOPn−1 are encoded by use of video data in GOPn, . . . , one or a plurality of video data in GOPn+1 are encoded by use of video data in GOPn+2, respectively.

Accordingly, when video data is reproduced or transmitted in the reverse direction, as shown in FIG. 6B, the GOPs are arranged in the direction opposite to that in the encoding. Therefore, as is clear from the left-hand direction arrows in FIG. 6B, one or a plurality of video data in GOPn+2 are encoded by use of video data in GOPn+1, one or a plurality of video data in GOPn+1 are encoded by use of video data in GOPn, one or a plurality of video data in GOPn are encoded by use of video data in GOPn−1, and one or a plurality of video data in GOPn−1 are encoded by use of video data in GOPn−2. Accordingly, as shown by left-hand direction arrows with crosses affixed thereto, of all decoded image data, B pictures and P pictures other than B pictures and P pictures encoded within the GOPs are decoded by video data different from those used in the encoding.

However, the rearrangement means 101 rearranges video data under control of the control means 107 such that video data are arranged in the two kinds of arrangements as shown in FIGS. 6C and 6D. Video data arranged in the arrangement shown in FIG. 6C is supplied to the decoding means 102, and video data arranged in the second arrangement shown in FIG. 6D is supplied to the decoding means 103.

As shown in FIG. 6C, of outputs decoded by the decoding means 102 as shown by left-hand direction arrows, arrows showing video data in GOPn+1 and video data in GOPn−1 are affixed with "open circles". "Open circles" show that, because GOP data are rearranged by the rearrangement means 101, video data in GOPn+1 and video data of GOPn−1 are correctly decoded by use of the same video data as those used in the encoding. GOPs shown by arrow with crosses show that video data contain video data decoded by use of video data different from those used in the encoding.

As shown in FIG. 6D, of outputs decoded by the decoding means 103 as shown by left-hand direction arrows, arrows showing video data in GOPn and video data in GOPn−2 are affixed with "open circles". "Open circles" show that, because GOP data are rearranged by the rearrangement means 101, video data in GOPn and video data of GOPn−2 are correctly decoded by use of the same video data as those used in the encoding. GOPs shown by arrow with crosses show that video data contain video data decoded by use of video data different from those used in the encoding.

A decoded output from the decoding means 102 is supplied to the selecting means 104 in which, as shown in FIG. 6G, GOPn+2 and GOPn including video data decoded by use of video data different from those used in the encoding are eliminated from GOPn+1, GOPn+2, GOPn−1, GOPn shown in FIG. 6C. A decoded output from the decoding means 103 is supplied to the selecting means 104 in which, as shown in FIG. 6H, GOPn+1 and GOPn−1 including video data decoded by video data different from those used in the encoding are eliminated from GOPn, GOPn+1, GOPn−2, GOPn−1 shown in FIG. 6D. As a consequence, the output from the selecting means 104 is temporarily stored in the memory means 105, and read out in the sequential order in which it is supplied to the input terminal 100 as shown in FIG. 6I. This output is outputted from an output terminal 106 as reverse-direction reproduced output. Specifically, as shown in FIG. 6I, video data in the output become only correctly-decoded video data by use of the same video data as those used in the encoding.

By the above-mentioned processing, video data that cannot be reproduced in the reverse direction because they have been decoded by use of video data different from those in the encoding can be correctly decoded and used. Therefore, when video data is reproduced in the reverse direction, the change of reproduced image becomes smooth, and hence a picture quality of reproduced picture can be improved considerably.

In the following description of the embodiment, in order to understand the present invention more clearly, let it be assumed that B picture is obtained by use of preceding and succeeding video data, and that I picture is obtained by intraframe-coding. In actual practice, upon encoding, of compensated macroblock data compensated by the forward direction motion compensation, the interpolation motion compensation and the backward direction motion compensation, macroblock data with a highest coding-efficiency is selected. Upon decoding, the same compensation as that in the encoding is carried out at the macroblock unit. Specifically, difference data within one B picture becomes data subtracted by the compensated macroblock data compensated by any one of compensation of the forward direction motion compensation, the interpolation motion compensation and the backward direction motion compensation. Difference data within one P picture becomes data subtracted by the compensated macroblock data compensated by the forward direction motion compensation or the backward direction motion compensation. Accordingly, in the following description, except when video data of every frame is referred to as "video data", "video data" is understood as "video data of every macroblock".

Figure 7:
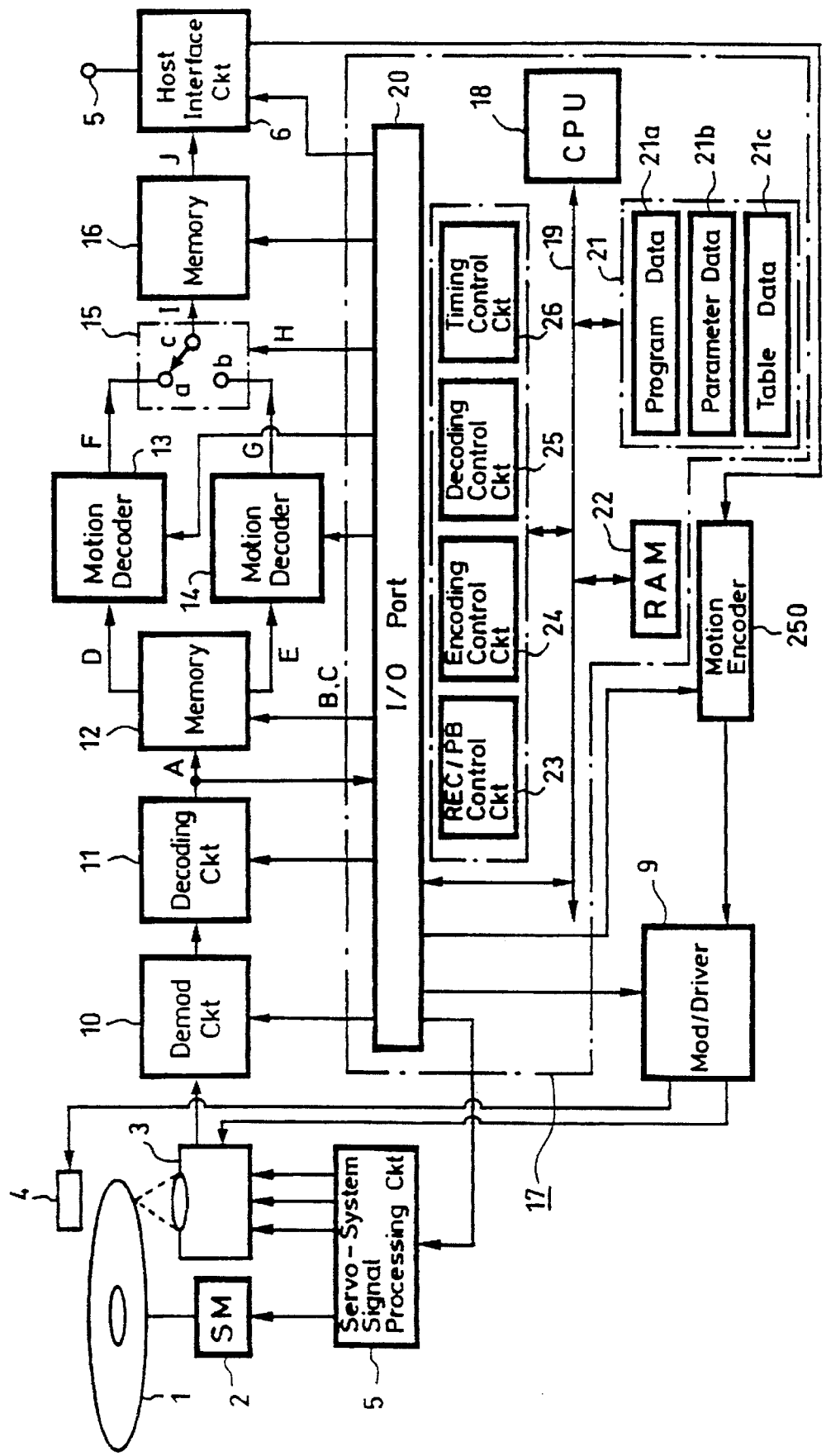
FIG. 7 is a block diagram showing a magnetooptical disk drive to which the video information decoding apparatus and the video information reproducing apparatus according to the present invention are applied.

FIG. 7 is a block diagram showing an example wherein the data processing shown in FIGS. 6A through 6I is realized by a magnetooptical disk drive.

As shown in FIG. 7, the magnetooptical disk drive comprises a spindle motor (SM) 2 for rotating a magnetooptical disk 1, an optical block 3, a servo-system signal processing circuit 4 for driving the spindle motor 2 and effecting servo processing such as tracking servo, focusing servo or sled transport on the optical block 3, a magnetic head 4 for applying a magnetic field to the magnetooptical disk 1, a demodulating circuit 10 for demodulating a reproduced RF signal supplied thereto from the optical block 3, a decoding circuit 11 for decoding an output from the demodulating circuit 10, a memory 12 for storing therein the output from the decoding circuit 11, motion decoders 13, 14 for decoding GOP data read out from the memory 12, a switch 15 for selecting the outputs of the motion decoders 13, 14, a memory 16 for storing therein the output of the switch 15, a host interface circuit 6 for supplying the output of the memory 16 through an SCSI (small computer systems interface) bus, not shown, to a host computer or the like, a motion encoder 250 for encoding data supplied thereto from the host computer, not shown, through the SCSI bus, a modulator/driver 9 for recording data on the magnetooptical disk 1 by driving a laser diode (not shown) of the optical block 3 and the magnetic head 4 on the basis of the encoded output supplied thereto from the motion encoder 250, and a system controller 17 for controlling the above circuit elements.

The system controller 17 and the memory 12 correspond to the rearrangement means 101 shown in FIGS. 6A through 6I, the motion decoder 13 corresponds to the decoding means 102 shown in FIGS. 6A through 6I, the motion decoder 14 corresponds to the decoding means 103 shown in FIGS. 6A through 6I, the switch 15 and the system controller 17 correspond to the selecting means 104 shown in FIGS. 6A through 6I, the memory 16 corresponds to the memory means 105 shown in FIGS. 6A through 6I, and the system controller 17 corresponds to the control means 107 shown in FIGS. 6A through 6I.

Figure 2:
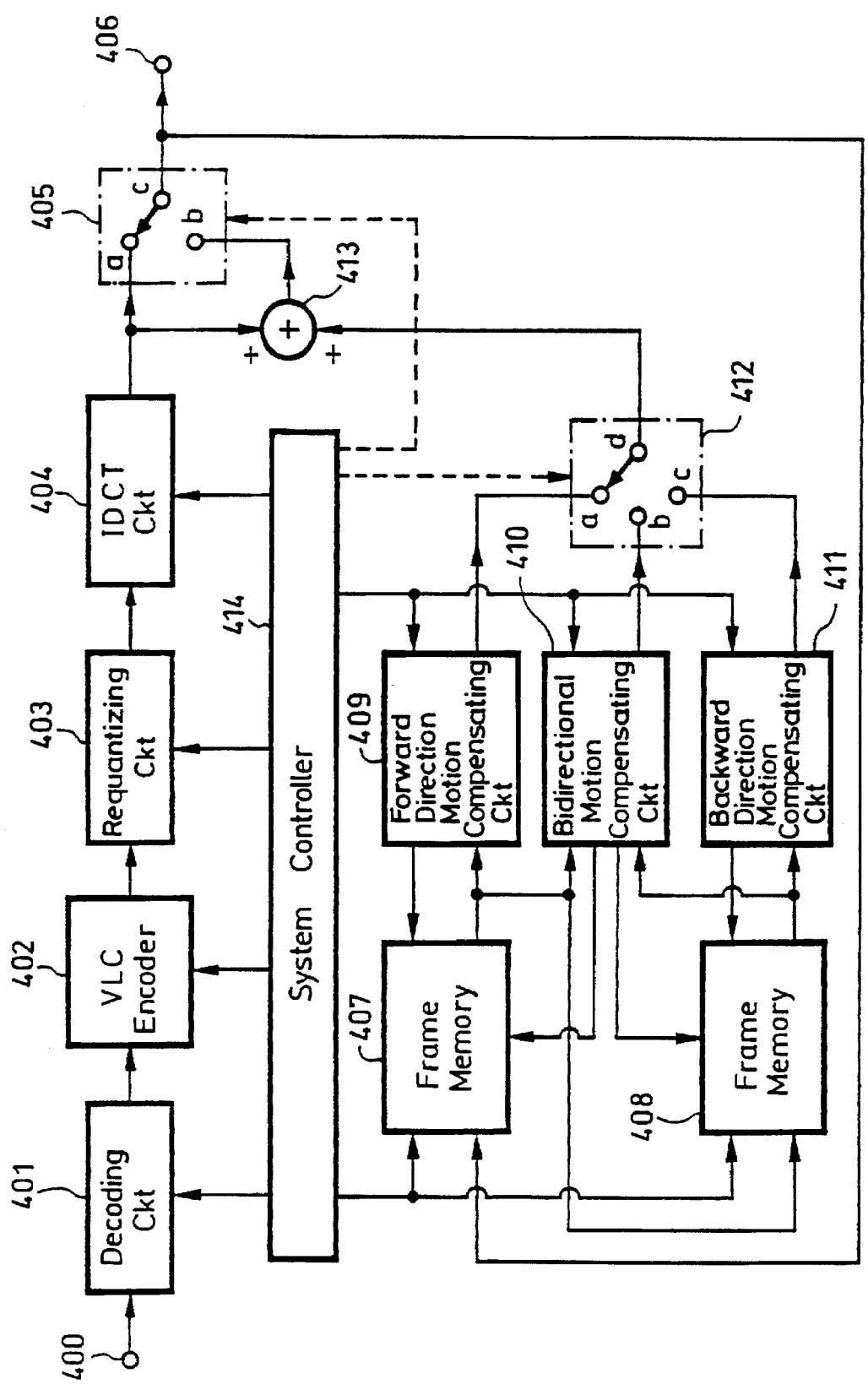
FIG. 2 is a block diagram showing an example of a motion decoder used in a conventional information transmitting apparatus and a conventional recording and reproducing apparatus.
Figure 3:
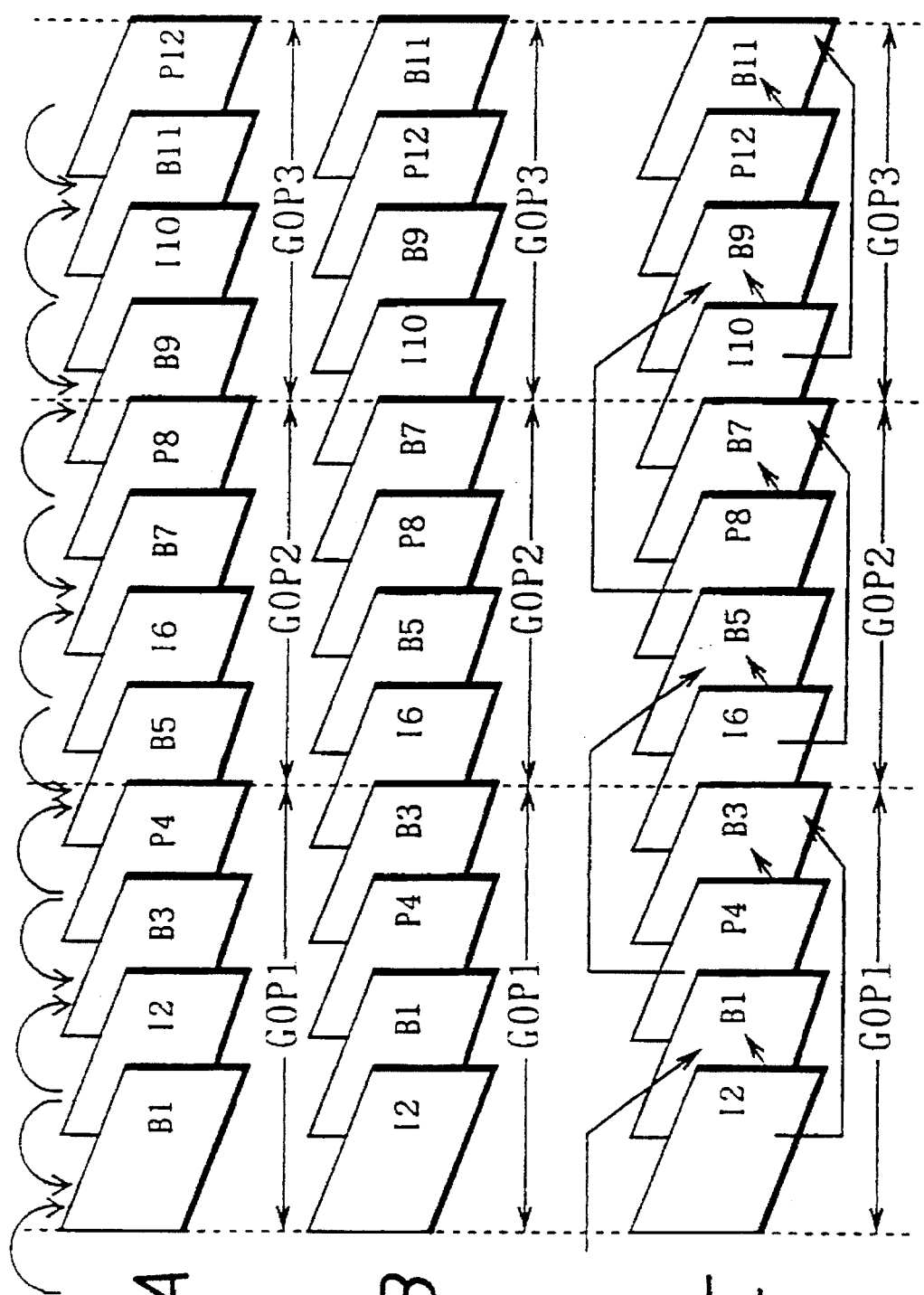
Figure 4:
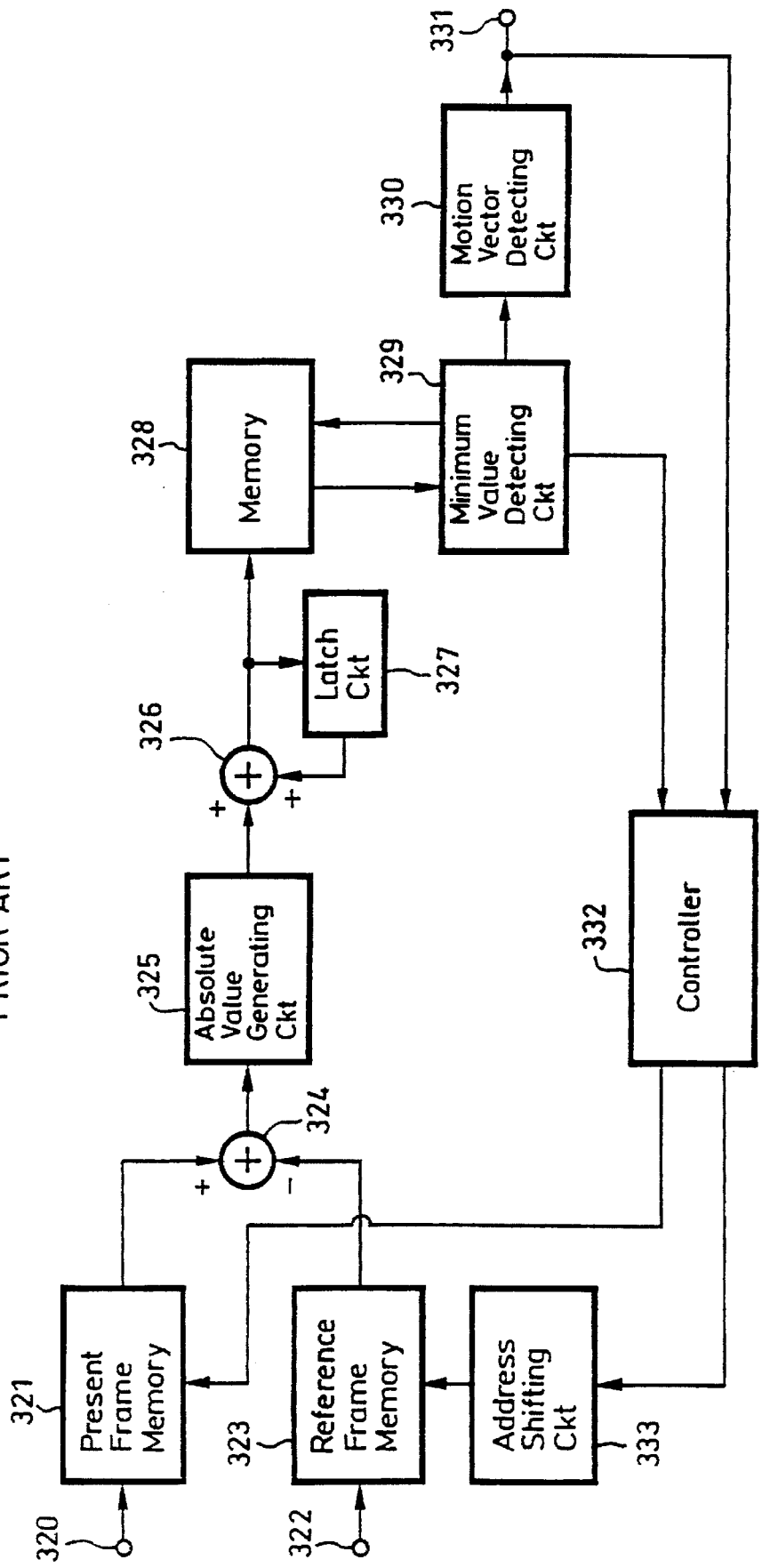
FIG. 4 is a block diagram showing inside arrangement of motion detecting circuits 205, 206 shown in FIG. 1.
Figure 5:
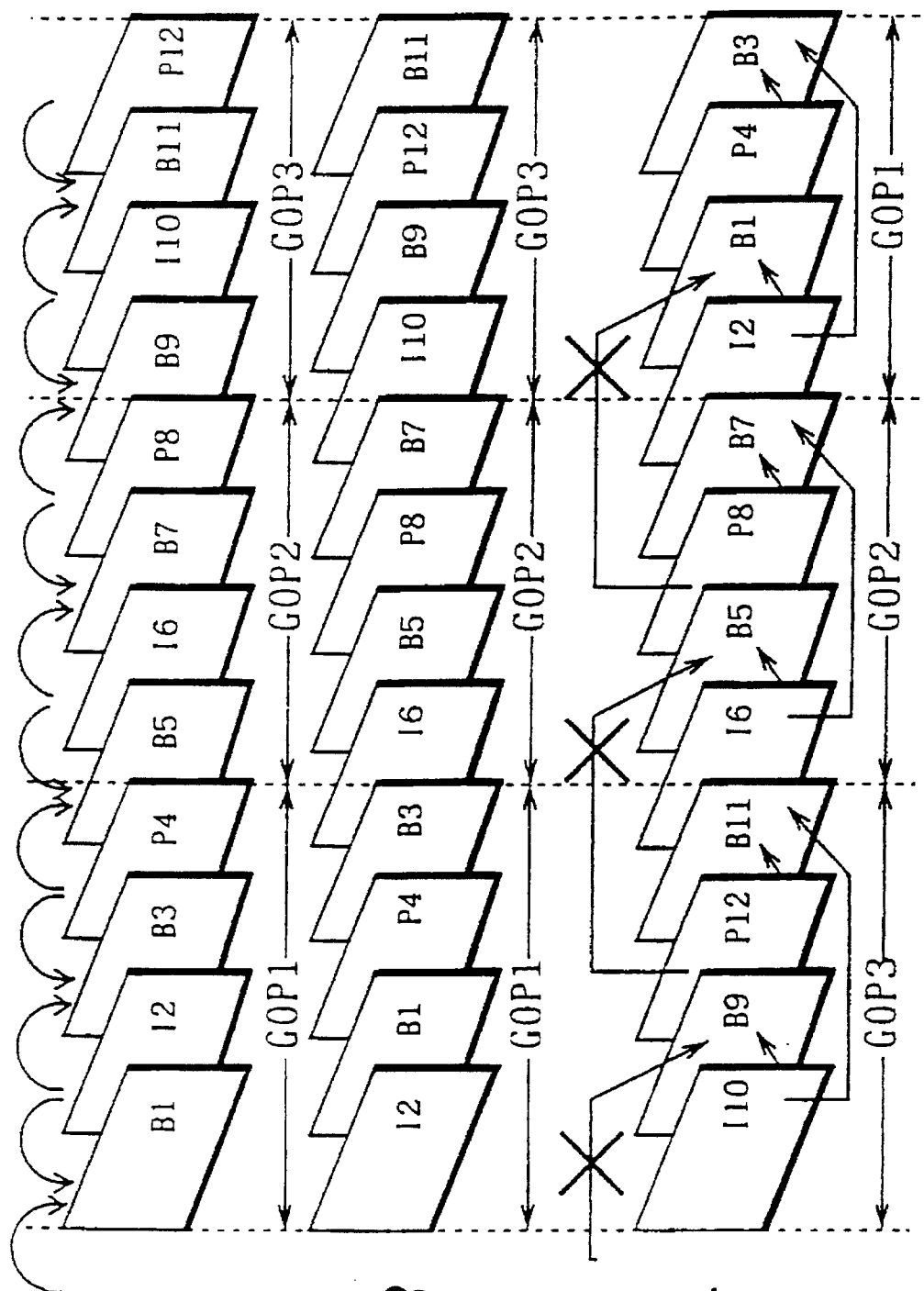

The decoding circuit 11 comprises the decoding circuit 401, the VLC decoder 402, the re-quantizing circuit 403 and the IDCT circuit 405 shown in FIG. 2. The motion decoders 13, 14 comprise the switches 405, 412, the adding circuit 413, the frame memories 407, 408, the forward direction motion compensating circuit 409, the bidirectional motion compensating circuit 410, and the backward direction motion compensating circuit 411. The motion encoder 250 is the same as the motion encoder 250 shown in FIG. 1.

The system controller 17 will be described initially. In the system controller 17, a bus 19 composed of an address bus, a control bus and a data bus is connected to a CPU (central processing unit) 18, an input and output port (I/O) 20, a ROM 21 with program data 21a, control parameter data 21b and table data 21c, which will be described later on, stored therein, and a RAM 22 serving as a control work area based on the program data 21a stored in the ROM 21 are connected to the bus 19. When the magnetooptical disk drive is energized, the program data 21a stored in the ROM 21 resides in the main memory of the CPU 18 so that, as shown by a one-dot chain line in FIG. 7, the system controller 17 functions as a recording and reproducing control means 23 for controlling recording and reproducing of data, an encoding control means 24 for controlling encoding processing in the motion encoder 250, a decoding control means for controlling decoding processing in the motion decoders 13, 14, and a timing control means 26 for controlling writing and reading of data in and from the memories 12, 16, exchanging of data to and from the host interface circuit 6, and controlling of various timings such as switching of the switch 15, etc.

When a command supplied from the host computer (not shown) through the input and output terminal 5 and the host interface circuit 6 is a command indicative of the positive-direction playback, the decoding control means 25 in the system controller 17 supplies a write/read control signal for controlling the correct reading order to the switch 15 in cooperation with the timing control means 26 such that the switch 15 connects a movable contact c to one fixed contact a.

When a command supplied from the host computer (not shown) through the input and output terminal 5 and the host interface circuit 6 is a command indicative of the reverse-direction playback, the decoding control means 25 in the system controller 17 supplies a write/read control signal for controlling the different reading order to the switch 15 in cooperation with the timing control means 26 such that the switch 15 connects the movable contact c to one fixed contact a and the other fixed contact b at every four frames.

Various control operations by the decoding control means 25 and the timing control means 26 in the system controller 17 are executed on the basis of data indicative of motion compensation type, data indicative of picture type, data indicative of leading portion of GOP, data indicative of encoding order extracted from the output of the decoding circuit 11, and reference horizontal and vertical sync signals or the like. Since the system controller 17 can previously recognize by checking the above respective data erroneously-decoded video data of decoded GPO from decoded video data decoded from GOP data supplied thereto from the motion decoders 13, 14, the system controller 17 can eliminate decoded video data of GOP containing video data decoded by use of video data different from those used in the encoding by properly switching the switch 15.

Data is supplied from the host computer, not shown, through the input and output terminal 5 and the host interface circuit 6. This data is encoded by the motion encoder 250 and supplied to the modulator/driver 9, and recorded on the magnetooptical disk 1 by magnetic field modulation effected by driving the optical block 3 and the magnetic head 4 with the modulator/driver 9.

Data read out from the magnetooptical disk 1 by the optical block 13 is supplied to the demodulator 10 as a reproduced RF signal, processed by the demodulator 10 in a proper method such as waveform-equalization, and supplied to the decoding circuit 11. The data thus error-corrected by the decoding circuit 11 is supplied to the memory 12, and stored in the memory 12 in response to the write/read control signal supplied from the system controller 17. The system controller 17 extracts motion vector data, data indicative of the leading portion of GOP and data indicative of the encoding order from the data outputted from the decoding circuit 11. The data stored in the memory 12 are read out in response to the write/read control signal from the system controller 17 in such a manner that they are arranged in the different arrangements at the GOP unit. Data in one arrangement are supplied to the motion decoder 13, and data in another arrangement are read out after a predetermined time was elapsed since the data in one arrangement has been read out, and then supplied to the motion decoder 14.

The data decoded by the motion decoder 13 is supplied to one fixed contact a of the switch 15, and the data decoded by the motion decoder 14 is supplied to the other fixed contact b of the switch 15. Then, the output from the motion decoder 13 and the output from the motion decoder 14 are selectively outputted from the switch 15 when the switch 15 is changed in position in response to the switching control signal from the system controller 17. The data outputted through the switch 15 is supplied to the memory 16, and stored in the memory 16 in response to the write/read control signal supplied from the system controller 17. Data temporarily stored in the memory 16 is read out from the memory 16 on the basis of the write/read control signal from the system controller 17, and supplied through the host interface circuit 6, the input and output terminal 5 and the SCSI bus to the host computer, not shown.

Figure 8:
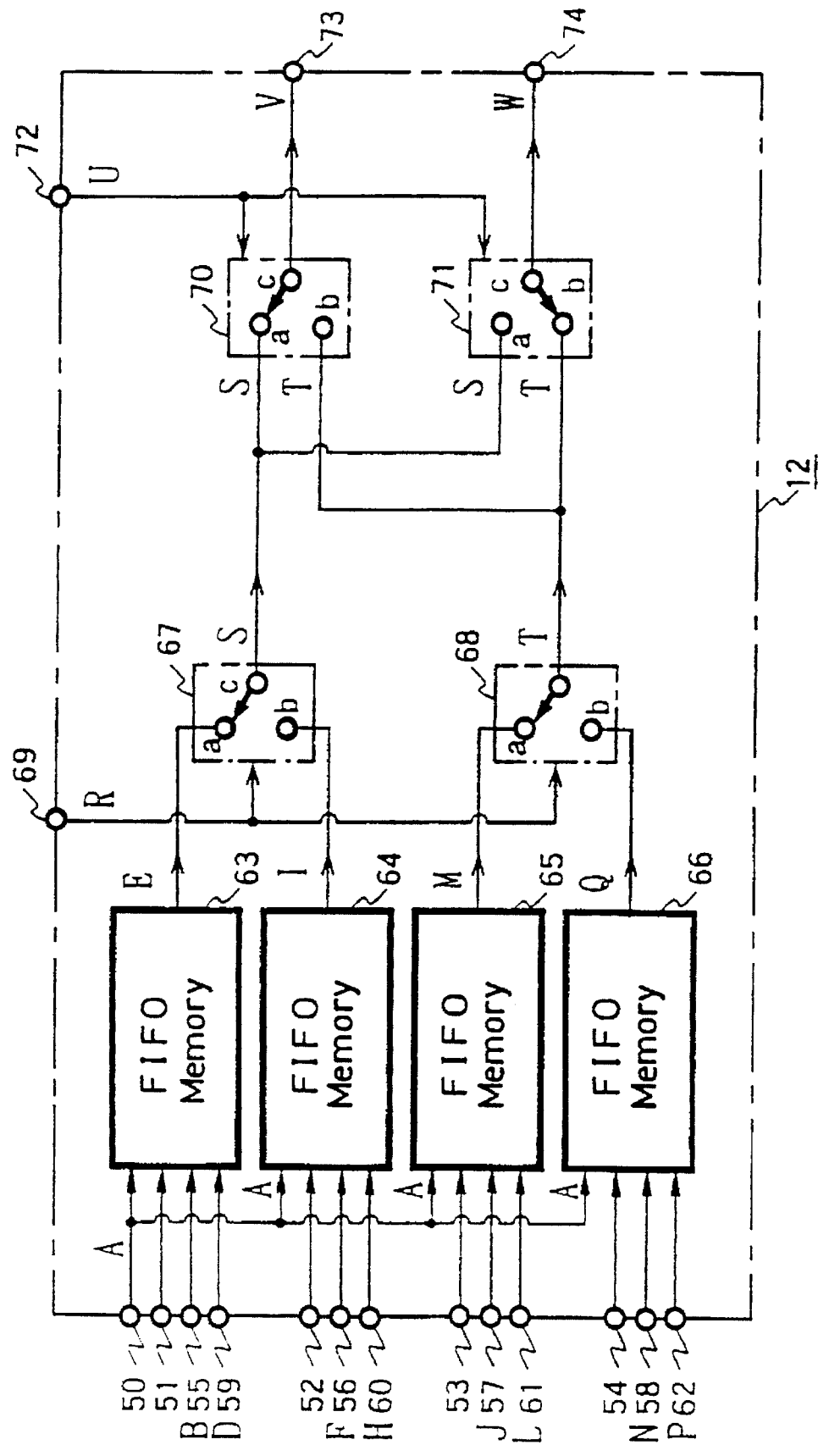
FIG. 8 is a block diagram showing a memory 12 shown in FIG. 7.

FIG. 8 is a block diagram showing the inside arrangement of the memory 12 shown in FIG. 7.

As shown in FIG. 8, the memory 12 comprises FIFO (first in first out) memories 63, 64, 65 and 66 each having a storage capacity equal to the number of bits of whole data of at least one GOP, a switch 67 whose one and the other fixed contacts a and b are connected to output terminals of the FIFO memories 63, 64, a switch 68 whose one and the other fixed contacts a and b are connected to output terminals of the FIFO memories 65, 66, a switch 70 having one fixed contact a connected to a movable contact c of the switch 67 and the other fixed contact b connected to a movable contact c of the switch 68, and a switch 71 having one fixed contact a connected to a movable contact c of the switch 67 and the other fixed contact b connected to a movable contact c of the switch 68.

Connections of respective terminals will be described. A data input terminal 50 is connected to the output terminal of the decoding circuit 11 shown in FIG. 7, address input terminals 51, 52, 53 and 54 are connected to the address output terminals of the I/O port 20 of the system controller 17 shown in FIG. 7, write enable signal input terminals 55, 56, 57, 58 are connected to write enable signal output terminals of the I/O port 20 of the system controller 17 shown in FIG. 7, read enable signal input terminals 59, 60, 61 and 62 are connected to read enable signal output terminals of the I/O port 20 of the system controller 17 shown in FIG. 7, switching control signal input terminals 69, 72 are connected to switching control signal output terminals of the I/O port 20 of the system controller 17 shown in FIG. 7, a data output terminal 73 is connected to the input terminal of the motion decoder 13 shown in FIG. 7, and a data output terminal 74 is connected to the input terminal of the motion decoder 14 shown in FIG. 7, respectively. Although not shown, reset terminals of the FIFO memories 63, 64, 65, 66 are connected to reset signal output terminals of the I/O port 20 of the system controller 17 shown in FIG. 7.

Although the FIFO memories 63, 64 are used when the arrangement of inputted GOPs is either the positive direction or the reverse direction, the FIFO memories 65, 66 are used only when the arrangement of the inputted GOPs is the reverse direction. A word "used" means that the write enable signals inputted through the write enable signal input terminals 55, 56, 57, 58 and the read enable signals inputted through the read enable signal input terminals 59, 60, 61, 62 become active, and used in inputting and outputting data in actual practice.

The switches 67, 68 connect the movable contacts c to the fixed contacts a or b in response to the switching control signal supplied thereto through the switching control signal input terminal 69, and the switches 70, 71 connect the movable contacts c to the fixed contacts a or b in response to the switching control signal supplied thereto through the switching control signal input terminal 72.

A writing operation of GOP data will be described.

The FIFO memories 63, 64, 65, 66 are reset by the reset signals from the system controller 17 shown in FIG. 7. Then, when the write enable signals from the system controller 17 become active, the FIFO memories 63, 64, 65, 66 store GOP data sequentially supplied from the decoding circuit 11 at the positions on the memory spaces indicated by the address signals supplied to the address input terminals 51, 52, 53, 54. The system controller 17 constantly checks write and read timings of the four FIFO memories 63, 64, 65, 66, and controls the FIFO memories 63, 64, 65, 66 in such a manner that the read address does not catch up with the write address.

A reading operation of GOP data will be described.

If the arrangement of inputted GOP is the arrangement of the positive direction, then when the read enable signals supplied from the system controller 17 shown in FIG. 7 through the read enable signal input terminals 59, 60, 61, 62 become active, the GOP data stored in the memory spaces indicated by the address signals supplied to the address input terminals 51, 52, 53, 54 are read out from the FIFO memories 63, 64, 65, 66. On the other hand, in response to the switching control signal supplied from the system controller 17 through the switching control signal input terminal 69, the switches 67, 68 connect the movable contacts c to the fixed contacts a or b. In response to the switching control signal supplied thereto from the system controller 17 through the input terminal 72, the switch 70 connects the movable contact c to the fixed contact a, and the switch 71 connects the movable contact c to the other fixed contact b.

If the arrangement of inputted GOPs is the arrangement of the reverse direction, then when the read enable signals supplied from the system controller 17 shown in FIG. 7 through the read enable signal input terminals 59, 60, 61, 62 become active, GOP data stored on the memory spaces indicated by the address signals supplied to the address input terminals 51, 52, 53, 54 are read out from the FIFO memories 63, 64, 65, 66, respectively. On the other hand, in response to the switching control signal supplied from the system controller 17 shown in FIG. 7 through the switching control signal input terminal 69, the switches 67, 68 connect the movable contacts c to the fixed contacts a or b. In response to the switching control signal supplied from the system controller 17 through the input terminal 72, the switch 70 connects the movable contact c to the fixed contact a or b at a cycle twice the switching cycle of the switches 67, 68, and the switch 71 connects the movable contact c to the fixed contact a or b at a cycle twice the switching cycle of the switches 67, 68.

FIG. 9 is a table used to explain an example of the table data 21c shown in FIG. 7. As already explained, "positive direction mode" and "reverse direction mode" are available as modes. The longitudinal direction in each mode indicates the fixed contacts or b to be connected to the movable contact c of the fixed contacts a and b of the switches 67, 68, 70, 71 shown n FIG. 8, and values of the switching control signals. The lateral direction indicates a period T n times (e.g., "6") the period necessary for writing GOP data in the FIFO memories 63, 64, 65, 66. Although switching control signals are shown on the upper and lower portions of each mode, the switching control signals on the upper stage are used top switch the switches 67, 68, and the switching control signals on the lower stage are used to switch the switches 70, 71, and are switching control signals supplied through the input terminal 72 shown in FIG. 8.

The system controller 17 controls the switching of the switches 67, 68, 70, 71 of the memory 12 with reference to the contents of the table data 21c. During the first period T in the positive direction mode, the switching control signal shown on the upper stage goes to "1" so that the movable contacts c of the switches 67, 68 are connected to the fixed contacts a. Also, the switching control signal shown on the lower stage goes to "1" so that the movable contact c of the switch 70 is connected to the fixed contact a and that the movable contact c of the switch 71 is connected to the fixed contact b. Thus, the data stored in the FIFO memory 3 is supplied through the switch 70 to the motion decoder 13 shown in FIG. 7. During the period T, the switching control signal shown on the upper stage goes to "0" so that the movable contacts c of the switches 67, 68 are connected to the fixed contact b. Also, the switching control signal shown on the lower stage goes to "1" so that the movable contact c of the switch 70 is connected to the fixed contact a and that the movable contact c of the switch 71 is connected to the fixed contact b. Thus, the data stored in the FIFO memory 64 is supplied through the switch 70 to the motion decoder 13 shown in FIG. 7. In the "positive direction mode", no data is inputted to and outputted from the FIFO memories 65, 66, and hence the output of the switch 71 need not be described.

During other periods, the switches 67, 68, 70, 71 are switched on the basis of the contents of table data 21c similarly as described above, and data is transmitted through transmission lines formed by the switching.

FIGS. 10A through 10V are timing charts used to explain a manner in which data are inputted to and outputted from the FIFO memories 63, 64 when the arrangement of inputted data is the positive direction arrangement. Reference letter "A" in FIG. 10A corresponds to "A" shown in FIGS. 7 and 8. Similarly, reference letters "B" to "V" correspond to "B" to "V" in FIGS. 7 and 8. For the sake of simplicity, as shown in FIG. 10A, the case that GOP data GOP1, GOP2, GOP3, GOP4 are supplied as data will be described.

As shown in FIG. 10A, the GOP data GOP1, GOP2, GOP3, GOP4 are supplied from the decoding circuit 11 shown in FIG. 7 to the data input terminal 50 shown in FIG. 8. Then, as shown in FIG. 10B, the write enable signal supplied from the system controller 17 shown in FIG. 7 through the write enable signal input terminal 55 to the FIFO memory 63 becomes active only when the GOP data GOP1, GOP3 are supplied to the FIFO memory 63. The address signal from the system controller 17 shown in FIG. 7 is supplied through the address input terminal 51 to the FIFO memory 63. Accordingly, as shown in FIG. 10C, the GOP data GOP1, GOP3 are sequentially stored in the FIFO memory 63.

Then, as shown in FIG. 10F, the write enable signal supplied from the system controller 17 shown in FIG. 7 through the write enable signal input terminal 56 to the FIFO memory 64 becomes active only when the GOP data GOP2, GOP4 are supplied to the FIFO memory 64. Also, the address signal from the system controller 17 shown in FIG. 7 is supplied through the address input terminal 52 to the FIFO memory 64. Accordingly, as shown in FIG. 10G, the GOP data GOP2, GOP4 are sequentially stored in the FIFO memory 64.

On the other hand, as shown in FIG. 10D, the read enable signal supplied from the system controller 17 shown in FIG. 7 to the FIFO memory 63 through the read enable signal input terminal 59 becomes active after the GOP data GOP1 and GOP3 have been written. Also, the address signal from the system controller 17 shown in FIG. 7 is supplied through the address input terminal 51 to the FIFO memory 63. Thus, as shown in FIG. 10E, the GOP data GOP1 and GOP3 are sequentially read out from the FIFO memory 63.

As shown in FIG. 10H, the read enable signal supplied from the system controller 17 shown in FIG. 7 to the FIFO memory 64 through the read enable signal input terminal 60 becomes active after the GOP data GOP2 and GOP4 have been written. Also, the address signal from the system controller 17 shown in FIG. 7 is supplied through the address input terminal 52 to the FIFO memory 64. Thus, as shown in FIG. 10E, the GOP data GOP2 and GOP4 are sequentially read out from the FIFO memory 64.

Therefore, the GOP data GOP1, GOP3 are supplied to the fixed contact a of the switch 67 as shown in FIG. 10E, and the GOP data GOP2, GOP4 are supplied to the other fixed contact b of the switch 67 as shown in FIG. 10I. A switching control signal shown in FIG. 10R is supplied to the switch 67 through the switching control signal input terminal 69. When this switching control signal goes to high "1" level, the switch 67 connects the movable contact c to the fixed contact a to select the GOP data GOP1. Then, when the switching control signal goes to low "0" level, the switch 67 connects the movable contact c to the other fixed contact b to select the GOP data GOP2. When the switching control signal goes to high "1" level, the switch 67 connects the movable contact c to the fixed contact a to select the GOP data GOP3. Then, when the switching control signal goes to low "0" level, the switch 67 connects the movable contact c to the other fixed contact b to select the GOP data GOP4.

Accordingly, as shown in FIG. 10S, the output from the switch 67 has the arrangement of GOP data composed of GOP1, GOP2, GOP3 and GOP4 (not shown), in that order. This output is supplied to the switches 70, 71. A switching control signal shown in FIG. 10U is supplied to the switches 70, 71 through the switching control signal input terminal 72. Since this switching control signal is continuously held at high "1" level (broken line in FIG. 10U shows low "0" level), the movable contacts c of the switches 70, 71 are connected to the fixed contacts a. Therefore, the GOP data GOP1, GOP2, GOP3, GOP4 shown in FIG. 10V are supplied through the output terminal 73 to the motion decoder 13 shown in FIG. 7. The motion decoder 14 is stopped in decoding operation under control of the system controller 17, and only the motion decoder 13 is operated.

FIGS. 11A through 11Q and FIGS. 12E' through 12W are timing charts used to explain a manner in which data are inputted to and outputted from the FIFO memories 63, 64, 65, 66 when the arrangement of inputted data is the reverse direction arrangement. Reference letter "A" in FIGS. 11A through 11Q corresponds to "A" shown in FIGS. 7 and 8. Similarly, reference letters "B" to "Q" correspond to "B" to "Q" in FIGS. 7 and 8. For the sake of simplicity, as shown in FIG. 11A, only the case that GOP data GOP9, GOP8, . . . , GOP–2 ("–" in "–2" means a minus from an order standpoint) are supplied as data will be described below.

As shown in FIG. 11A, the GOP data GOP9, GOP8, . . . , GOP–2 are supplied from the decoding circuit 11 shown in FIG. 7 to the data input terminal 50 shown in FIG. 8. Then, as shown in FIG. 11B, the write enable signal supplied from the system controller 17 shown in FIG. 7 through the write enable signal input terminal 55 to the FIFO memory 63 becomes active only when the GOP data GOP9, GOP5, GOP1 are supplied to the FIFO memory 63. The address signal from the system controller 17 shown in FIG. 7 is supplied through the address input terminal 51 to the FIFO memory 63. Accordingly, as shown in FIG. 11C, the GOP data GOP9, GOP5, GOP1 are sequentially stored in the FIFO memory 63.

Then, as shown in FIG. 11F, the write enable signal supplied from the system controller 17 shown in FIG. 7 through the write enable signal input terminal 56 to the FIFO memory 64 becomes active only when the GOP data GOP8, GOP4, GOP0 are supplied to the FIFO memory 64. Also, the address signal from the system controller 17 shown in FIG. 7 is supplied through the address input terminal 52 to the FIFO memory 64. Accordingly, as shown in FIG. 11G, the GOP data GOP8, GOP4, GOP0 are sequentially stored in the FIFO memory 64.

Then, as shown in FIG. 11J, the write enable signal supplied from the system controller 17 shown in FIG. 7 to the FIFO memory 65 through the write enable signal input terminal 57 becomes active only when the GOP data GOP7, GOP3, GOP–1 are supplied to the FIFO memory 65. The address signal from the system controller 17 shown in FIG. 7 is supplied through the FIFO memory 65 through the address input terminal 53. Accordingly, as shown in FIG. 11K, the GOP data GOP7, GOP3, GOP–1 are sequentially stored in the FIFO memory 65.

Then, as shown in FIG. 11N, the write enable signal supplied from the system controller 17 shown in FIG. 7 to the FIFO memory 66 through the write enable signal input terminal 58 becomes active only when the GOP data GOP6, GOP2, GOP–2 are supplied to the FIFO memory 66. The address signal from the system controller 17 shown in FIG. 7 is supplied to the FIFO memory 66 through the address input terminal 54. Thus, as shown in FIG. 11O, the GOP data GOP6, GOP2, GOP–2 are sequentially stored in the FIFO memory 66.

On the other hand, as shown in FIG. 11D, the read enable signal supplied from the system controller 17 shown in FIG. 7 to the FIFO memory 63 through the read enable signal input terminal 59 becomes sequentially active twice after the GOP data GOP9, GOP5, GOP1 have been written. Also, the address signal from the system controller 17 shown in FIG. 7 is supplied through the address input terminal 51 to the FIFO memory 63. Thus, as shown in FIG. 11E, the GOP data GOP9, GOP5, GOP1 are sequentially read out twice from the FIFO memory 63.

As shown in FIG. 11H, the read enable signal supplied from the system controller 17 shown in FIG. 7 to the FIFO memory 64 through the read enable signal input terminal 60 becomes sequentially active twice after the GOP data GOP8, GOP4, GOP0 have been written. Also, the address signal from the system controller 17 shown in FIG. 7 is supplied through the address input terminal 52 to the FIFO memory 64. Thus, as shown in FIG. 10E, the GOP data GOP8, GOP4, GOP0 are sequentially read out twice from the FIFO memory 64.

On the other hand, as shown in FIG. 11L, the read enable signal supplied from the system controller 17 shown in FIG. 7 to the FIFO memory 65 through the read enable signal input terminal 61 becomes sequentially active twice after the GOP data GOP7, GOP3, GOP–1 have been written. The address signal from the system controller 17 shown in FIG. 7 is supplied to the FIFO memory 65 through the address input terminal 53. Thus, as shown in FIG. 11M, the GOP data GOP7, GOP3, GOP–1 are sequentially read out twice from the FIFO memory 65.

As shown in FIG. 11P, the read enable signal supplied from the system controller 17 shown in FIG. 7 to the FIFO memory 66 through the read enable signal input terminal 62 becomes sequentially active twice after the GOP data GOP6, GOP2, GOP–2 have been written. The address signal from the system controller 17 shown in FIG. 7 is supplied to the FIFO memory 66 through the address input terminal 54. Thus, as shown in FIG. 11Q, the GOP data GOP6, GOP2, GOP–2 are sequentially read out twice from the FIFO memory 66.

The above operation will be described with reference to FIGS. 12E' through 12W. In order to understand the present invention more easily, read GOP data shown in FIGS. 11E, 11I, 11M, 11Q are illustrated again in FIGS. 12E' through 12Q'. As reference letters, "E'" corresponds to the "E", "I'" corresponds to the "I", "M'" corresponds to the "M", and "Q'" corresponds to the "Q", respectively.

As shown in FIG. 12E', GOP data GOP9, GOP9, GOP5, GOP5, GOP1, GOP1 are outputted from the FIFO memory 63, and these GOP data GOP9, GOP9, GOP5, GOP5, GOP1, GOP1 are supplied to the fixed contact a of the switch 67.

As shown in FIG. 12I', GOP data GOP8, GOP8, GOP4, GOP4, GOP0, GOP0 are outputted from the FIFO memory 64, and these GOP data GOP8, GOP8, GOP4, GOP4, GOP0, GOP0 are supplied to the other fixed contact b of the switch 67.

As shown in FIG. 12M', GOP data GOP7, GOP7, GOP3, GOP3, GOP–1, GOP–1 are outputted from the FIFO memory 65, and these GOP data GOP7, GOP7, GOP3, GOP3, GOP–1, GOP–1 are supplied to the fixed contact a of the switch 68.

As shown in FIG. 12Q', GOP data GOP6, GOP6, GOP2, GOP2, GOP–2, GOP–2 are outputted from the FIFO memory 66, and these GOP data GOP6, GOP6, GOP2, GOP2, GOP–2, GOP–2 are supplied to the other fixed contact b of the switch 68.

A switching control signal shown in FIG. 12R is supplied through the switching control signal input terminal 69 to the switch 67. Each time this switching control signal goes to high "1" level, the switch 67 connects the movable contact c to the fixed contact a to sequentially select the GOP data GOP9, GOP9, GOP5, GOP5, GOP1, GOP1. Each time this switching control signal goes to low "0" level, the switch 67 connects the movable contact c to the other fixed contact b to sequentially select the GOP data GOP8, GOP8, GOP4, GOP4, GOP0, GOP0.

Accordingly, the output of the switch 67 becomes an output in the arrangement shown in FIG. 12S wherein the GOP data GOP9, GOP9, GOP5, GOP5, GOP1, GOP1 from the FIFO memory 63 and the GOP data GOP8, GOP8, GOP4, GOP4, GOP0, GOP0 from the FIFO memory 64 are alternately selected, i.e., an output composed of the GOP data GOP9, GOP8, GOP9, GOP8, GOP5, GOP4, GOP5, GOP4, GOP1, GOP0, GOP1, GOP0. This output is supplied to the switch 70.

A switching control signal shown in FIG. 12R is supplied through the switching control signal input terminal 69 to the switch 68. Each time this switching control signal goes to high "1" level, the switch 68 connects the movable contact c to the fixed contact a to sequentially select the GOP data GOP7, GOP7, GOP3, GOP3, GOP-1, GOP-1. Each time this switching control signal goes to low "0" level, the switch 68 connects the movable contact c to the other fixed contact b to sequentially select the GOP data GOP6, GOP6, GOP2, GOP2, GOP-2, GOP-2.

Accordingly, the output of the switch 68 becomes an output in the arrangement shown in FIG. 12T wherein the GOP data GOP7, GOP7, GOP3, GOP3, GOP-1, GOP-1 from the FIFO memory 65 and the GOP data GOP6, GO6, GOP2, GOP2, GOP-2, GOP-2 from the FIFO memory 66 are alternately selected, i.e., an output composed of the GOP data GOP7, GOP6, GOP, GOP6, GOP3, GOP2, GOP3, GOP2, GOP-1, GOP-2, GOP-1, GOP-2. This output is supplied to the switch 71.

A switching control signal shown in FIG. 12U is supplied through the switching control signal input terminal 72 to the switch 70. When this switching control signal goes to high "1" level, the switch 70 connects the movable contact c to the fixed contact a to select the GOP data GOP8 and GOP9 shown in FIG. 12S. Then, when this switching control signal goes to low "0" level, the switch 70 connects the movable contact c to the other fixed contact b to select the GOP data GOP6, GOP7. Then, when the switching control signal goes to high "1" level, the switch 70 connects the movable contact c to the fixed contact a to select the GOP data GOP4, GOP5 shown in FIG. 12S. When the switching control signal goes to low "0" level, the switch 70 connects the movable contact c to the other fixed contact b to select the GOP data GOP2, GOP3 shown in FIG. 12T. Then, when the switching control signal goes to high "1" level, the switch 70 connects the movable contact c to the fixed contact a to select the GOP data GOP0, GOP1 shown in FIG. 12S. A selected output of the switch 70 is shown in FIG. 12V. The selected output from the switch 70 is supplied through the output terminal 73 to the motion decoder 13 shown in FIG. 7.

A switching control signal shown in FIG. 12U is supplied through the switching control signal input terminal 72 to the switch 71, similarly to the switch 70. When this switching control signal goes to high "1" level, the switch 71 connects the movable contact c to the other fixed contact b to select the GOP data GOP7 shown in FIG. 12T. Then, when this switching control signal goes to low "0" level, the switch 71 connects the movable contact c to the fixed contact a to select the GOP data GOP8, GOP5 shown in FIG. 12S. Then, when the switching control signal goes to high "1" level, the switch 71 connects the movable contact c to the other fixed contact b to select the GOP data GOP6, GOP3 shown in FIG. 12T. When the switching control signal goes to low "0" level, the switch 71 connects the movable contact c to the fixed contact a to select the GOP data GOP4, GOP1 shown in FIG. 12S. Then, when the switching control signal goes to high "1" level, the switch 71 connects the movable contact c to the other fixed contact b to select the GOP data GOP2, GOP-1 shown in FIG. 12T. A selected output of the switch 71 is shown in FIG. 12W. The selected output from the switch 71 is supplied through the output terminal 74 to the motion decoder 14 shown in FIG. 7.

FIGS. 13A through 13D are diagrams used to explain differences of data length used when video data is written in and read out from the memory 12 shown in FIG. 8. In FIGS. 10A through 10V to FIGS. 12E' through 12W, the length of the writing period of GOP data and the length of the reading period of GOP are different, and the reason for this will be described below. Areas shown by dots and "W" in FIGS. 13A to 13D correspond to GOP data of the write periods shown in FIGS. 10A through 10V to FIGS. 12E' through 12W, and areas shown hatched and "R" correspond to GOP data of the read periods shown in FIGS. 10A through 10V to FIGS. 12E' through 12W.

As shown in FIG. 13A, the reason that the read period is longer than the write period in FIGS. 10A through 10V to FIGS. 12E' through 12W is neither based on a large amount of GOP data nor the timebase expansion executed in the read period. As shown in FIGS. 10A, 11A, the GOP data is intermittently supplied from the decoding circuit 11 to the memory 12 so that, as shown in FIG. 13B, the GOP data temporarily written in the memory 12 is read out little by little intermittently. This is determined by the specifications of the motion decoders 13, 14 shown in FIG. 7.

Depending on the specifications of the motion decoders 13, 14 shown in FIG. 7, as shown in FIG. 13C, the length of the read period need not be made longer than that of the write period. However, as shown in FIG. 13D, the GOP data is read out from the memory 12 during the period of the length same as that of the write period, and GOP data thus read may be supplied to the motion decoders 13, 14. In this embodiment, the specifications of the motion decoders 13, 14 correspond to the system described with reference to FIGS. 13A, 13B.

A decoding operation in the positive and reverse direction playback will be described. As shown in FIG. 13E, GOP data GOPn, GOPn+1 read out from the memory 12, for example, comprise I picture, B picture, P picture, B picture. These I picture, B picture, P picture, B picture are composed of data which are intermittently read out little by little as shown hatched. Decoded outputs from the motion decoders 13, 14 are set to the original data arrangement shown in FIG. 13F.

FIGS. 14A through 14J are diagrams used to explain a decoding operation executed when the magnetooptical disk drive shown in FIG. 7 reproduces video data at +1 time normal playback speed mode (positive-direction one time normal speed playback mode). FIGS. 14A through 14J correspond to the positions shown in FIG. 7. "I" represents I picture, and "B" picture represents B picture. Numerals represent the order in which data are inputted upon encoding, i.e., first, second, . . . , nth frames. Since the orders of inputted data upon encoding were already described with reference to FIGS. 3A through 3C and FIGS. 5A through 5C, only the orders of data used upon decoding will be described. In the following description, for the sake of brevity, of two B pictures in GOP data, the first B picture is video data of preceding (past) GOP as compared with the GOP of the video data when the B picture is generated, i.e., encoded.

As shown in FIG. 14A, in the case of the positive-direction one time normal playback speed mode, GOP data are inputted in the order at which they are encoded by the motion encoder 250, i.e., in the order of I, B, P and B pictures. A data series intermittently supplied at every four frames is decoded by the decoding circuit 11, and supplied to the memory 12. The memory 12 is reset by a reset signal shown in FIG. 14B Thereafter, a write enable signal shown in FIG. 14C is supplied to the memory 12. When this write enable signal is at high "1" level, the write operation becomes active, and the output from the decoding circuit 11 is stored in the memory 12.

The system controller 17 supplies the same address signal as the address value used to start storing data in the memory 12 to the memory 12 in order to read GOP data stored in the memory 12 from the memory 12 in the order at which GOP data are stored in the memory 12. Under control of the system controller 17, the movable contacts c of the switches 67, 68 shown in FIG. 8 are connected to the fixed contacts a, b at every period T, the movable contact c of the switch 70 shown in FIG. 8 is connected to the fixed contact a, and the movable contact c of the switch 71 is connected to the fixed contact b, whereby data read out from the memory 12 are supplied to the motion decoder 13. The system controller 17 supplies the motion vector data to the motion decoder 13, and also supplies a switching control signal shown in FIG. 14H to the switch 15 so that the switch 15 connects the movable contact c to the fixed contact a.

The motion decoder 13 sequentially carries out decoding, and sequentially outputs video data of original frames as shown in FIG. 14F. The output from the motion decoder 13 is supplied through the switch 15 to the memory 16, and temporarily stored in the memory 16 in response to the write/read control signal from the system controller 17. Subsequently, the stored data is read out from the memory 16 in the order shown in FIG. 14J, i.e., the order of positive-direction playback mode in response to the write/read control signal from the system controller 17. The video data of first, second, . . . , nth frames are supplied to the host computer (not shown) through the host interface circuit 6, the output terminal 5 and the SCSI bus.

FIGS. 15A through 15J are diagrams used to explain a decoding operation executed when the magnetooptical disk drive shown in FIG. 7 reproduces video data at −1 time normal playback speed mode (reverse-direction one time normal speed playback mode). FIGS. 15A through 15J correspond to the positions shown in FIG. 7. "I" represents I picture, and "B" picture represents B picture. Numerals represent the order in which data are inputted upon encoding, i.e., first, second, . . . , nth frames. Since the orders of inputted data upon encoding were already described with reference to FIGS. 3A through 3C and FIGS. 5A through 5C, only the orders of data used upon decoding will be described. In the following description, for the sake of brevity, of two B pictures in GOP data, the first B picture is video data of preceding (past) GOP as compared with the GOP of the video data when the B picture is generated i.e., encoded.

As shown in FIG. 15A, in the case of the reverse-direction one time normal playback speed mode, GOP data are inputted in the order opposite to the order at which they are encoded by the motion encoder 250. A data series intermittently supplied at every four frames is decoded by the decoding circuit 11, and supplied to the memory 12. The memory 12 is reset by a reset signal shown in FIG. 15B Thereafter, a write enable signal shown in FIG. 15C is supplied to the memory 12. When this write enable signal is at high "1" level, the write operation becomes active, and the output from the decoding circuit 11 is stored in the memory 12.

The system controller 17 supplies the same address signal as the address value used to start storing data in the memory 12 to the memory 12 in order to read GOP data stored in the memory 12 from the memory 12 in the order opposite to the order at which GOP data are stored in the memory 12. As shown in the switch change-over table shown in FIG. 9, the system controller 17 supplies the switching control signals to the switches 67, 68, 70, 71 shown in FIG. 8 so that the movable contacts c of the switches 67, 68 are connected to the fixed contacts a or b during the period T and that the movable contacts c of the switches 70, 71 are connected to the fixed contacts a or b during the period 2T.

The GOP data temporarily stored in the memory 12 are read out in the order different from the order in which they are stored in the memory 12, i.e., in the order of GOP3, GOP4, GOP1, GOP2 as shown in FIG. 15D. The GOP data thus read are supplied to the motion decoder 13 under control of the switches 67, 68, 70, 71. On the other hand, the GOP data temporarily stored in the memory 12 are read out from the memory 12 in the order different from the order in which they are stored in the memory 12, i.e., in the sequential order of GOP2, GOP3, GOP0, GOP1 as shown in FIG. 15E. The GOP data thus read are supplied to the motion decoder 14 under control of the switches 67, 68, 70 and 71.

The motion decoder 13 sequentially carries out decoding, and outputs video data of original frames sequentially as shown in FIG. 15F. At that time, of the video data shown in FIG. 15F, video data of 9th frame shown hatched and video data of 1st frame shown hatched are video data encoded by use of video data different from those used in the encoding.

Although the video data of 9th frame is encoded by use of video data of GOP2 upon encoding, the video data of 9th frame is decoded by use of video data of GOP5 upon decoding, and hence is not correctly-decoded video data. Also, although the video data of 1st frame is encoded by use of video data of GOP0 upon encoding, the video data of 1st frame is decoded by use of video data of GOP4 upon decoding, and hence is not correctly-decoded video data.

The motion decoder 14 also sequentially carries out decoding, and outputs video data of original frames sequentially as shown in FIG. 15G. At that time, of the video data shown in FIG. 15G, video data of 5th frame shown hatched and video data of −3rd frame shown hatched are video data encoded by use of video data different from those used in the encoding.

Although the video data of 5th frame is encoded by use of video data of GOP1 upon encoding, the video data of 5th frame is decoded by use of video data of GOP4 upon decoding, and hence is not correctly-decoded video data. Also, although the video data of −3rd frame is encoded by use of video data of GOP−1 (not shown) upon encoding, the video data of −3rd frame is decoded by use of video data of GOP3 upon decoding, and hence is not correctly-decoded video data.

However, the system controller 17 previously recognizes on the basis of data indicative of motion compensation type, data indicative of picture type, data indicative of leading portion of GOP and data indicative of encoding order whether or not decoded video data of GOP contains video data decoded by use of video data different from those used in the encoding. Thus, based on such recognition, processing time of the motion decoders 13, 14, and the reference horizontal and vertical sync signals, the system controller 17 supplies a switching control signal, which goes to "0" or "1" a every four frames as shown in FIG. 15H, to the switch 15. When this switching control signal is at "0", the switch 15 connects the movable contact c to the fixed contact a. When this switching control signal is at "1", the movable contact c of the switch 15 is connected to the fixed contact b.

Accordingly, of the outputs from the motion decoder 13 as shown in FIG. 15F, video data of 13th, 14th, 15th and 16th frames, and video data of 5th, 6th, 7th and 8th frames are outputted through the switch 15. of the outputs of the motion decoder 14 as shown in FIG. 15G, video data of 9th, 10th, 11th and 12th frames, and video data of 1st, 2nd, 3rd and 4th frames are outputted through the switch 15. The output of the switch 15 is shown in FIG. 15I. The output (see FIG. 15I) of the switch 15 is supplied to the memory 16, and temporarily stored in the memory 16 in response to the write/read control signal from the system controller 17. Then, the video data stored in the memory 16 is read out from the memory 16 in the correct order shown in FIG. 15J, i.e., in the order of reproduced GOP unit in response to the write/read control signal from the system controller 17, and fed through the host interface circuit 6, the input and output terminal 5 and the SCSI bus to the host computer, not shown.

As described above, according to the first embodiment, in the reverse-direction reproducing mode, video data is decoded by video data different from those used in the encoding. Data with the different arrangement of the GOP unit are supplied to the motion decoders 13, 14, in which they are decoded. Of the outputs from the motion decoders 13, 14, the reproduced video data of GOP containing video data decoded by use of video data different from those used in the encoding are eliminated, and remaining reproduced video data of GOP from the motion decoders 13, 14 are outputted as one output. Thus, even in the reverse-direction reproducing mode, original video data can be all decoded by use of the same video data as those used in the encoding. Therefore, in the reverse-direction reproducing mode, all decoded image data of B picture can be used, and hence the change of the reproduced picture can be made smooth.

According to the first embodiment, when B picture is obtained by encoding, the video data of GOP which precedes the GOP to which the video data belong from a time standpoint is subtracted from the video data to be encoded as described above. The principle of the present invention can be similarly applied to the case that video data of GOP other than the GOP to which the video data belongs may be subtracted from the video data to be encoded upon encoding, with similar effects being achieved.

A second embodiment of the present invention will be described below.

Figures 16A, 16B:
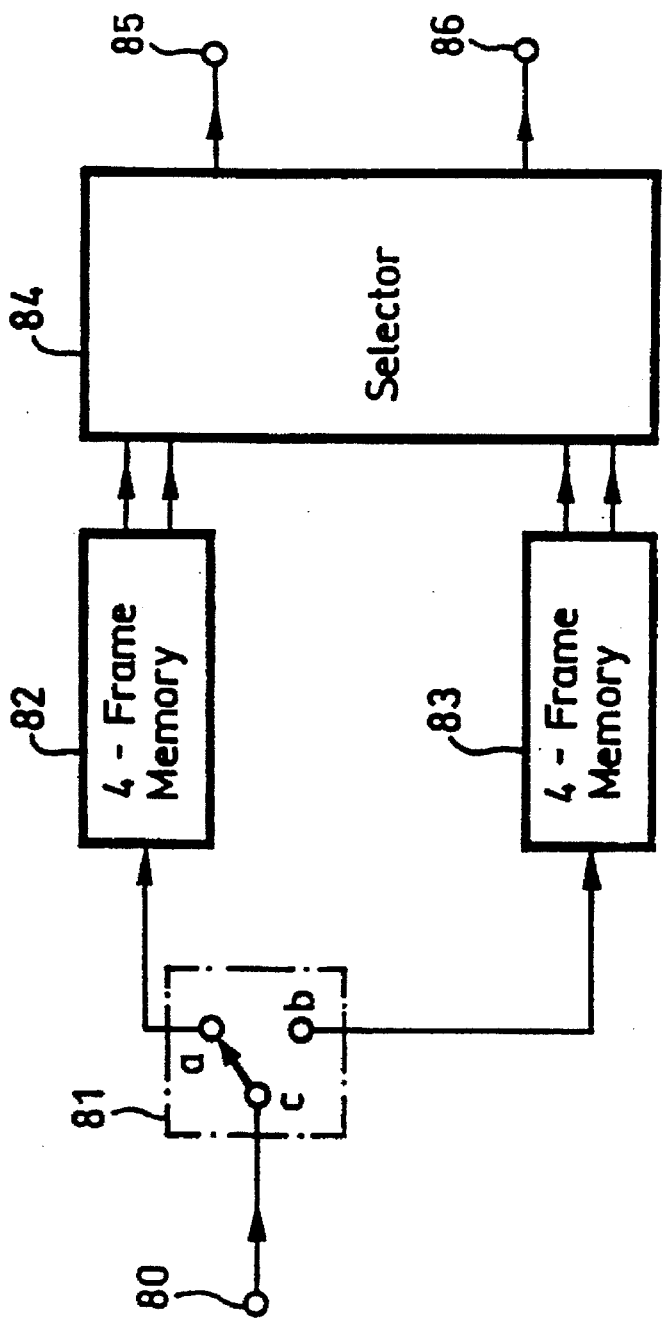
FIGS. 16A is a block diagram showing other example of the memory 12 shown in FIG. 7.
FIG. 16B is a table showing an example of table data 21c.

FIG. 16A is a block diagram showing other inside arrangement of the memory 12 shown in FIG. 7, and FIG. 16B is a diagram showing table data used to control the memory 12 shown in FIG. 16A. This table data is stored in the ROM 21 as the table data 21c shown in FIG. 7.

As shown in FIG. 17A, the memory 12 comprises a switch 81 whose movable contact c is connected to an input terminal 80 to which decoded GOP data from the decoding circuit 11 shown in FIG. 7 is supplied, a 4-frame memory 82 whose input terminal is connected to a fixed contact a of the switch 81, a 4-frame memory 83 whose input terminal is connected to the other fixed contact b of the switch 81, and a selector 84 for selectively supplying the outputs from the 4-frame memories 82, 83 to the decoder 13 or 14 shown in FIG. 7.

The 4-frame memories 82, 83 are of dual-port memory, and a plurality of GOP data can be simultaneously read out from one 4-frame memory 82 or 83.

The table data shown in FIG. 16B will be described. The table data shown in FIG. 16B is composed of leading address, ending address, GOP number and data indicative of memory. In this table data, the above data are respectively registered when the GOP data are stored in the 4-frame memories 82, 83 after the table data 21c serving as a default value of the ROM 21 shown in FIG. 7 has been stored in the RAM 22. The system controller 17 reads out video data on the basis of contents of the table data registered upon writing.

In the illustrated example, "M1" is used as the data indicating data, and this shows the 4-frame memory 82 shown in FIG. 16A. Data indicating the 4-frame memory 83 shown in FIG. 16A is "M2". Data such as "GOP1" shown in FIG. 16B is used as GOP number data, and the "GOP1" represents the leading GOP. In this embodiment, "GOP1" means that GOP data stored from the leading address "0000" to the ending address "xxxx" of the 4-frame memory 82 is "GOP1". This table data is used by the system controller 17 shown in FIG. 7.

Only the case that the arrangement of inputted GOP data is the reverse direction will be described. Under control of the system controller 17 shown in FIG. 7, the fixed contact c of the switch 81 is connected to the fixed contact a. Decoded output from the decoding circuit 11, i.e., GOP data is supplied to the 4-frame memory 82, and stored in the 4-frame memory 82 in response to the write/read control signal from the system controller 17. After all data from GOP1 to GOP4 have been stored in the 4-frame memory 82, the movable contact c of the switch 81 is connected to the other fixed contact b so that the decoded output from the decoding circuit 11, i.e., GOP data from the GOP5 to GOP8 are stored in the 4-frame memory 83.

During the data are stored in the 4-frame memory 83, the GOP data stored in the 4-frame memory 82 are read out with time differences of the two kinds of the arrangements. As to the two kinds of arrangements, FIGS. 15D, 15E will be referred to. The GOP data of the first and second arrangements read out from the 4-frame memory 82 are supplied to the motion decoders 13, 14 shown in FIG. 7, respectively. At the completion of reading data from the 4-frame memory 82, the GOP data stored in the 4-frame memory 83 are read out with the above time differences of the two kinds of arrangements. The GOP data of the first and second arrangements read out from the 4-frame memory 83 are respectively supplied to the motion decoders 13, 14 shown in FIG. 7.

A third embodiment of the present invention will be described below.

In the first embodiment, the magnetooptical disk is used as the recording and reproducing medium, and the present invention is applied to the magnetooptical disk drive. The present invention can similarly be applied to the case that a magnetic tape is a recording and reproducing medium and that the present invention is applied to the VTR. With such arrangement, the spindle motor 2, the optical pickup 3 and the magnetic head 4 shown in FIG. 7 are replaced with a tape transport unit. When the recording and reproducing medium is a semiconductor memory, the spindle motor 2, the optical pickup 3, the magnetic head 4 and the servo-system signal processing circuit 5 are replaced with a semiconductor memory and a semiconductor memory controller. When an optical disk such as CD-ROM is used as the recording and reproducing medium, the magnetic head 4, the modulator/driver 9 and the motion encoder 250 may be eliminated. When a hard disk is used as the recording and reproducing medium, the optical head 3 shown in FIG. 7 may be eliminated. Further, when the present invention is applied to a communication apparatus, the spindle motor 2, the optical pickup 3, the magnetic head 4, and the servo-system signal processing circuit 5 may become a receiving circuit for receiving a signal transmitted via a transmission cable or at an antenna. Also, the modulator/driver 9 may become a transmitting circuit. That is, with any media or media drive, the above effects can be achieved similarly.

According to the present invention, when a plurality of video data are inputted at the decoding unit in the order opposite to the order in which a plurality of video data in the decoding unit are encoded upon encoding, at least the selecting means is inhibited from selecting decoding unit containing decoded video data decoded by use of video data different from video data used in the encoding. Therefore, only the video data of the decoding unit containing the video data decoded by use of video data different from video data used in the encoding is eliminated, and only correct video data can be outputted. Therefore, all encoded video data can be used so that, when a picture is displayed in the reverse direction, the change of picture in the reverse direction can be made smooth considerably.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as define in the appended claims.

What is claimed is:

1. A video data decoding apparatus for decoding data composed of successive video data of a decoding unit including video data encoded by use of future or past or preceding and succeeding video data with respect to at least video data to be encoded, comprising:

first decoding means for decoding a first plurality of video data of said decoding unit;

second decoding means for decoding a second plurality of video data of said decoding unit;

rearranging means for obtaining at least two kinds of first and second arrangements by rearranging said video data of said decoding unit at every decoding unit, and selectively supplying said first plurality of video data of said first arrangement and said second plurality of video data of said second arrangement to said first and second decoding means;

selecting means for selecting the first plurality of decoded video data of said decoding unit from said first decoding means and the second plurality of decoded video data of said decoding unit from said second decoding means;

memory means for storing therein an output from said selecting means; and control means for inhibiting said selecting means from selecting said decoding unit containing video data decoded by use of video data different from video data used for decoding upon encoding of a plurality of inputted video data of said decoding unit when the order in which the plurality of video data of said decoding unit are inputted is opposite to the order in which the plurality of video data of said decoding unit are encoded upon encoding.

2. A video data decoding apparatus as claimed in claim 1, wherein said rearranging means comprises first, second, . . . , nth memories each having a storage capacity for storing at least video data of said decoding unit, first and second switches for selectively outputting outputs of said first, second, . . . , nth memories, a third switch for selectively outputting output from said first and second switches from an output terminal, and a fourth switch for selectively outputting outputs from said first and second switches from an output terminal.

3. A video data decoding apparatus as claimed in claim 2, wherein said control means includes a switch change-over table composed of switch change-over data for switching said first, second, third and fourth switches of said rearranging means in accordance with the form of video data of said decoding unit.

4. A video data reproducing apparatus for reproducing recorded data from a recording medium in which successive video data of a decoding unit including video data encoded by use of future or past or preceding and succeeding video data with respect to at least video data to be encoded are recorded, comprising:

first decoding means for decoding a first plurality of video data of said decoding unit;

second decoding means for decoding a second plurality of video data of said decoding unit;

rearranging means for obtaining at least two kinds of first and second arrangements by rearranging said video data of said decoding unit at every decoding unit, and selectively supplying said first plurality of video data of said first arrangement and said second plurality of video data of said second arrangement to said first and second decoding means;

selecting means for selecting the first plurality of decoded video data of said decoding unit from said first decoding means and the second plurality of decoded video data of said decoding unit from said second decoding means;

memory means for storing therein an output from said selecting means; and control means for inhibiting said selecting means from selecting said decoding unit containing video data decoded by use of video data different from video data used for decoding upon encoding of a plurality of inputted video data of said decoding unit when a reproducing mode of said recording medium is a reverse-direction reproducing mode.

5. A video data reproducing apparatus as claimed in claim 4, wherein said rearranging means comprises first, second, . . . , nth memories each having a storage capacity for storing at least video data of said decoding unit, first and second switches for selectively outputting outputs of said first, second, . . . , nth memories, a third switch for selectively outputting output from said first and second switches from an output terminal, and a fourth switch for selectively outputting outputs from said first and second switches from an output terminal.

6. A video data decoding apparatus as claimed in claim 5, wherein said control means includes a switch change-over table composed of switch change-over data for switching said first, second, third and fourth switches of said rearranging means in accordance with the form of video data of said decoding unit.

7. A video data reproducing apparatus for reproducing transmitted data in which successive video data of a decoding unit containing video data encoded by use of future or past or preceding and succeeding video data with respect to at least video data to be encoded, comprising:

first decoding means for decoding a first plurality of video data of said decoding unit;

second decoding means for decoding a second plurality of video data of said decoding unit;

rearranging means for obtaining at least two kinds of first and second arrangements by rearranging said video data of said decoding unit at every decoding unit, and selectively supplying said first plurality of video data of said first arrangement and said second plurality of video data of said second arrangement to said first and second decoding means;

selecting means for selecting the first plurality of decoded video data of said decoding unit from said first decoding means and the second plurality of decoded video data of said decoding unit from said second decoding means;

memory means for storing therein an output from said selecting means; and control means for inhibiting said selecting means from selecting said decoding unit containing video data decoded by use of video data different from video data used for decoding upon encoding of a plurality of inputted video data of said decoding unit when the order in which the plurality of video data of said decoding unit are transmitted is opposite to the order in which the plurality of video data of said decoding unit are encoded upon encoding.

8. A video data reproducing apparatus as claimed in claim 7, wherein said rearranging means comprises first, second, . . . , nth memories each having a storage capacity for storing at least video data of said decoding unit, first and second switches for selectively outputting outputs of said first, second, . . . , nth memories, a third switch for selectively outputting output from said first and second switches from an output terminal, and a fourth switch for selectively outputting outputs from said first and second switches from an output terminal.

9. A video data reproducing apparatus as claimed in claim 8, wherein said control means includes a switch change-over table composed of switch change-over data for switching said first, second, third and fourth switches of said rearranging means in accordance with the form of video data of said decoding unit.

10. A video data decoding apparatus for decoding video data encoded by use of past video data or future video data of video data to be encoded or past video data or future video data comprising:

reverse-reproducing means in which a unit defined by a group composed of a plurality of video data containing said encoded video data and reproducing said group containing said encoded video data at a group unit in the reverse direction of a timebase;

rearranging means for generating at least a first arrangement and a second arrangement by rearranging the order of said reverse-reproduced groups;

first decoding means for receiving said first arrangement from said rearranging means and generating first decoded video data by decoding a plurality of video data contained in said first arrangement;

second decoding means for receiving said second arrangement from said rearranging means and generating second decoded video data by decoding a plurality of video data contained in said second arrangement;

selecting means for selecting said group containing a plurality of said first decoded video data or said group containing a plurality of said second decoded video data; and control means for controlling said rearranging means, said first and second decoding means and said selecting means such that said group containing first or second video data decoded by use of video data different from video data used in encoding said encoded video data is not selected from said group containing said first decoded video data and said group containing said second decoded video data.

11. A video data decoding apparatus as claimed in claim 1, wherein said rearranging means includes a plurality of memories each having a storage capacity for storing therein groups including said video data, and said control means selectively switches reading of said groups stored in a plurality of memories in such a manner that said rearranging means generates at least said first arrangement and said second arrangement.

12. A video data decoding apparatus as claimed in claim 2, wherein said control means includes a table having switching information for selectively switching reading of said groups stored in a plurality of memories, and controls said rearranging means in accordance with said switching information stored in said table.

13. A video data decoding apparatus as claimed in claim 1, wherein said control means controls said switching means in such a manner that said switching means generates a first arrangement in which a group of group number N and a group of group number N-1 are alternately rearranged when said group number N-1 is smaller than said group number N and said group number N is an even number, and that said switching means generates a second arrangement in which said group of group number N and said group of group number N-1 are alternately rearranged when said group number N-1 is smaller than said group number N and said group number N is an odd number.

14. A recording and reproducing apparatus for recording video data on a recording medium at a recording and reproducing unit of groups composed of successive encoded video data and reproducing said video data from said recording medium, comprising:

encoding means for generating first video data encoded as first type video data and second video data encoded as second type video data by use of said first video data from a plurality of original video data supplied in the order of positive direction on a timebase;

recording means for recording said first video data and said second video data at said group unit such that an arrangement order of said group becomes a positive direction order;

reverse-reproducing means for reverse-reproducing said first video data and said second video data at said group unit such that an arrangement order of said groups becomes opposite to said positive direction order on said timebase;

decoding means for decoding said second video data by use of said first video data, and generating a plurality of decoded video data by decoding said first video data;

output means for continuously outputting successive decoded video data in a time series fashion such that the order of a plurality of decoded video data becomes opposite to the order of a plurality of original video data supplied in the positive direction order on said timebase; and control means for controlling said reproducing means, said encoding means and said outputting means in such a manner that encoded video data decoded by first encoded video data which is encoded video data contained in a group different from a group containing said second video data and which is the same video data as said first video data used in encoding said second video data is contained in said continuously outputted decoded video data and that decoded video data decoded by use of said first video data different from said first video data used in encoding said second video data is not contained in said continuously outputted decoded video data.

15. A recording and reproducing apparatus as claimed in claim 14, wherein said control means includes rearranging means for generating at least a first arrangement and a second arrangement by rearranging the order of reverse-reproduced groups, first decoding means for receiving said first arrangement from said rearranging means, and generating first decoded video data by decoding a plurality of video data contained in said first arrangement, second decoding means for receiving said second arrangement from said rearranging means, and generating second decoded video data by decoding a plurality of video data contained in said second arrangement, and selecting means for selecting said first decoded video data or said second decoded video data.

16. A recording and reproducing apparatus as claimed in claim 15, wherein said control means includes a plurality of memories each having a storage capacity for storing therein groups containing said video data, and said control means controls said rearranging means such that said rearranging means generates at least said first arrangement and said second arrangement by selectively switching reading of said groups stored in a plurality of memories.

17. A recording and reproducing apparatus as claimed in claim 16, wherein said control means includes a table having switching information for selectively switching reading of said groups stored in a plurality of memories, and controls said rearranging means in accordance with said switching information stored in said table.

18. A recording and reproducing apparatus as claimed in claim 16, wherein said control means controls said switching means in such a manner that said switching means generates a first arrangement in which a group of group number N and a group of group number N-1 are alternately rearranged when said group number N-1 is smaller than said group number N and said group number N is an even number, and that said switching means generates a second arrangement in which said group of group number N and said group of group number N-1 are alternately rearranged when said group number N-1 is smaller than said group number N and said group number N is an odd number.

19. A reproducing apparatus for reproducing first and second video data at a reproducing unit of groups composed of successive encoded video data from transmission media having first video data encoded as first type video data and second video data encoded as second type video data by use of said first video data, said first and second video data being video data encoded from a number of original video data supplied in a positive direction order on a timebase, comprising:

recording video data on a recording medium at a recording and reproducing unit of groups composed of the plurality of encoded video data and reproducing said video data from said recording medium, comprising:

reverse-reproducing means for reverse-reproducing said first video data and said second video data from said transmission media at said group unit such that an arrangement order of said groups becomes a negative direction order on said timebase;

decoding means for decoding said second video data by use of said first video data, and generating a plurality of decoded video data by decoding said first video data;

output means for continuously outputting the successive decoded video data in a time series fashion such that the order of a plurality of decoded video data becomes opposite to the order of a plurality of original video data supplied in the positive direction order on said timebase; and control means for controlling said reverse-reproducing means, said encoding means and said output means in such a manner that encoded video data decoded by first encoded video data which is encoded video data contained in a group different from a group containing said second video data and which is the same video data as said first video data used in encoding said second video data is contained in said continuously outputted decoded video data and that decoded video data decoded by use of said first video data different from said first video data used in encoding said second video data is not contained in said continuously outputted decoded video data.

20. A reproducing apparatus as claimed in claim 19, wherein said control means includes rearranging means for generating at least a first arrangement and a second arrangement by rearranging the order of reverse-reproduced groups, first decoding means for receiving said first arrangement from said rearranging means, and generating first decoded video data by decoding a plurality of video data contained in said first arrangement, second decoding means for receiving said second arrangement from said rearranging means, and generating second decoded video data by decoding a plurality of video data contained in said second arrangement, and selecting means for selecting said first decoded video data or said second decoded video data.

21. A reproducing apparatus as claimed in claim 20, wherein said control means includes a plurality of memories each having a storage capacity for storing therein groups containing said video data, and said control means controls said rearranging means such that said rearranging means generates at least said first arrangement and said second arrangement by selectively switching reading of said groups stored in a plurality of memories.

22. A reproducing apparatus as claimed in claim 21, wherein said control means includes a table having switching information for selectively switching reading of said groups stored in a plurality of memories, and controls said rearranging means in accordance with said switching information stored in said table.

23. A reproducing apparatus as claimed in claim 21, wherein said control means controls said switching means in such a manner that said switching means generates a first arrangement in which a group of group number N and a group of group number N-1 are alternately rearranged when said group number N-1 is smaller than said group number N and said group number N is an even number, and that said switching means generates a second arrangement in which said group of group number N and said group of group number N-1 are alternately rearranged when said group number N-1 is smaller than said group number N and said group number N is an odd number.

24. A reproducing apparatus for reproducing first and second video data from a recording medium having said first video data encoded as first type video data from a plurality of original video data supplied in a positive direction order on a timebase and second video data encoded as second type video data by use of said first video data, comprising:

reproducing means for reproducing said first video data and said second video data from said recording medium such that the order of video data transmitted from said recording medium becomes a negative direction order on said timebase;

decoding means for decoding said second video data reproduced by said reproducing means by use of said first video data, and generating a plurality of decoded video data by decoding said first video data reproduced by said reproducing means;

output means for continuously outputting the plurality of decoded video data in a time series fashion such that the order of the plurality of decoded video data becomes opposite to the order of the plurality of original video data supplied in the positive direction order on said timebase; and control means for controlling said reproducing means, said encoding means and said output means in such a manner that decoded video data decoded by use of first video data which is the same video data as said first video data used in encoding said second video data is contained in said continuously outputted decoded video data and that decoded video data decoded by use of said first video data different from said first video data used in encoding said second video data is not contained in said continuously outputted decoded video data.

* * * * *